(12) United States Patent
Topiwala et al.

(10) Patent No.: US 10,621,779 B1
(45) Date of Patent: Apr. 14, 2020

(54) ARTIFICIAL INTELLIGENCE BASED GENERATION AND ANALYSIS OF 3D MODELS

(71) Applicant: FASTVDO LLC, Melbourne, FL (US)

(72) Inventors: Pankaj N. Topiwala, Cocoa Beach, FL (US); Madhu Peringassery Krishnan, Columbia, MD (US); Wei Dai, Clarksville, MD (US)

(73) Assignee: FastVDO LLC, Melbourne, FL (US)

( * ) Notice: Subject to any disclaimer, the term of this patent is extended or adjusted under 35 U.S.C. 154(b) by 0 days.

(21) Appl. No.: 15/990,212

(22) Filed: May 25, 2018

Related U.S. Application Data

(60) Provisional application No. 62/511,290, filed on May 25, 2017.

(51) Int. Cl.
| | | |
|---|---|---|
| *G06T 17/00* | (2006.01) | |
| *G06K 9/62* | (2006.01) | |
| *G06T 7/50* | (2017.01) | |
| *G06T 7/62* | (2017.01) | |
| *G06N 5/00* | (2006.01) | |
| *G06N 3/08* | (2006.01) | |

(52) U.S. Cl.
CPC ............ *G06T 17/00* (2013.01); *G06K 9/629* (2013.01); *G06K 9/6256* (2013.01); *G06N 3/08* (2013.01); *G06N 5/00* (2013.01); *G06T 7/50* (2017.01); *G06T 7/62* (2017.01); *G06T 2207/10024* (2013.01); *G06T 2207/10028* (2013.01); *G06T 2207/20081* (2013.01)

(58) Field of Classification Search
CPC .. G06T 17/00; G06T 7/62; G06T 7/50; G06N 3/08; G06N 5/00; G06K 9/629

USPC .......................................................... 345/419
See application file for complete search history.

(56) References Cited

U.S. PATENT DOCUMENTS

| | | | |
|---|---|---|---|
| 8,520,736 B2 | 8/2013 | Topiwala | |
| RE44,743 E | 2/2014 | Topiwala et al. | |
| 9,524,028 B2 | 12/2016 | Dai et al. | |
| 9,829,984 B2 | 11/2017 | Dai et al. | |
| 10,052,026 B1* | 8/2018 | Tran ...................... G16H 50/30 | |
| 2014/0176565 A1* | 6/2014 | Adeyoola ............. G06T 19/006 345/473 |
| 2015/0055085 A1* | 2/2015 | Fonte ................. G06Q 30/0621 351/178 |

(Continued)

OTHER PUBLICATIONS

Hu Z. H., Ding Y.S, Yu X. K., Zhang W. B. & Yan Q. (2009). A Hybrid Neural Network and Immune Algorithm Approach for Fit Garment Design, Text. Res. J., 79(14), pp. 1319-1330.*

(Continued)

*Primary Examiner* — Jin Ge
(74) *Attorney, Agent, or Firm* — Fenwick & West LLP

(57) ABSTRACT

Artificial intelligence based techniques are used for analysis of 3D objects in conjunction with each other. A 3D model of two or more 3D objects is generated. Features of 3D objects are matched to develop a correspondence between the 3D objects. Two 3D objects are geometrically mapped and an object is overlayed on another 3D object to obtain a superimposed object. Match analysis of 3D objects is performed based on machine learning based models to determine how well the objects are spatially matched. The analysis of the objects is used in augmented reality applications.

17 Claims, 31 Drawing Sheets

(56) References Cited

U.S. PATENT DOCUMENTS

| | | | |
|---|---|---|---|
| 2016/0071322 A1* | 3/2016 | Nishiyama | G06T 19/00 345/632 |
| 2018/0047192 A1* | 2/2018 | Kristal | G06T 11/60 |
| 2018/0077400 A1* | 3/2018 | Ayari | H04N 13/271 |

OTHER PUBLICATIONS

Yang Hu, Xi Yi, and Larry S Davis. 2015. Collaborative fashion recommendation: a functional tensor factorization approach. In Proceedings of the ACM International Conference on Multimedia. ACM, 129-138.*

J. Li, J. Ye, Y. Wang, L. Bai, and G. Lu, "Technical Section: Fitting 3D Garment Models onto Individual Human Models," Computer Graphics, vol. 34, pp. 742-755, http://dx.doi.org/10.1016/ .cag.2010.07.008, Dec. 2010.*

S. Hauswiesner, M. Straka, and G. Reitmayr, "Virtual try-on through image-based rendering," IEEE Trans. Vis. Comput. Graph. vol. 19, No. 9,pp. 1552-1565, Sep. 2013.*

Arzu Vuruskan Turker Ince Ender Bulgun Cuneyt Guzelis , (2015),"Intelligent fashion styling using genetic search and neural classification", International Journal of Clothing Science and Technology,vol. 27 Iss 2 pp. 283-301.*

Sekine, M., Sugita, K., Perbet, F., Stenger, B., Nishiyama, M.: Virtual fitting by single-shot body shape estimation. In: Int. Conf. on 3D Body Scanning Technologies. pp. 406-413. Citeseer (2014).*

Kaixuan Liu, "study on knowledge-based garment design and fit evaluation system", Jan. 20, 2017.*

Hong Yan , X. Zeng , Pascal Bruniaux , Kaixuan Liu , Yan Chen , Xujing Zhang , Col-laborative 3D-To-2D tight-fitting garment pattern design process for scoliotic people, Fibres Text. East. Eur. 25 (2017) 113-118.*

Jun Zhang, Study on 3D �� odeling and �� attern-making for Upper Garment, Doctoral Dissertation (Shinshu University), Mar. 2017.*

S. Zeitvogel, A. Laubenheimer, Fitting a deformable 3D human body model to depth images using convolutional neural networks, 2016 12th IEEE International Symposium on Electronics and Telecommunications (ISETC), Timisoara, 2016, pp. 321-326.*

Stefan Hauswiesner, Matthias Straka & Gerhard Reitmayr (2011) "Free viewpoint virtual try-on with commodity depth cameras", In Proc. of the 10th International Conference on Virtual Reality Continuum and Its Applications in Industry (VRCAI '11), pp. 23-30.*

D. Tang, J. Zhang, K. Tang, L. Xu, and L. Fang, "Making 3D eyeglasses try-on practical," in Proc. Int. Conf. Multimedia Expo. Workshops, 2014, pp. 1-6.*

Y. A. Sekhavat. Privacy Preserving Cloth Try-On Using Mobile Augmented Reality. IEEE Transactions on Multimedia, 19(5):1041{1049, 2016. ISSN 1520-9210. doi: 10.1109/TMM.2016.2639380.*

W. Chen, H.Wang, Y. Li, H. Su, Z.Wang, C. Tu, D. Lischinski, D. Cohen-Or, and B. Chen. Synthesizing training images for boosting human 3D pose estimation. 3DV, 2016.*

Qin, F.-w., Li, L.-y., Gao, S.-m., Yang, X.-I., Chen, X., 2014. A deep learning approach to the classification of 3DCADmodels. J. Zhejiang Univ. Sci. C15 (2), 91-106.*

U.S. Appl. No. 62/384,532, filed Sep. 7, 2016, Inventor Topiwala, P. et al.

U.S. Appl. No. 15/698,410, filed Sep. 7, 2017, Inventor Topiwala, P. et al.

* cited by examiner

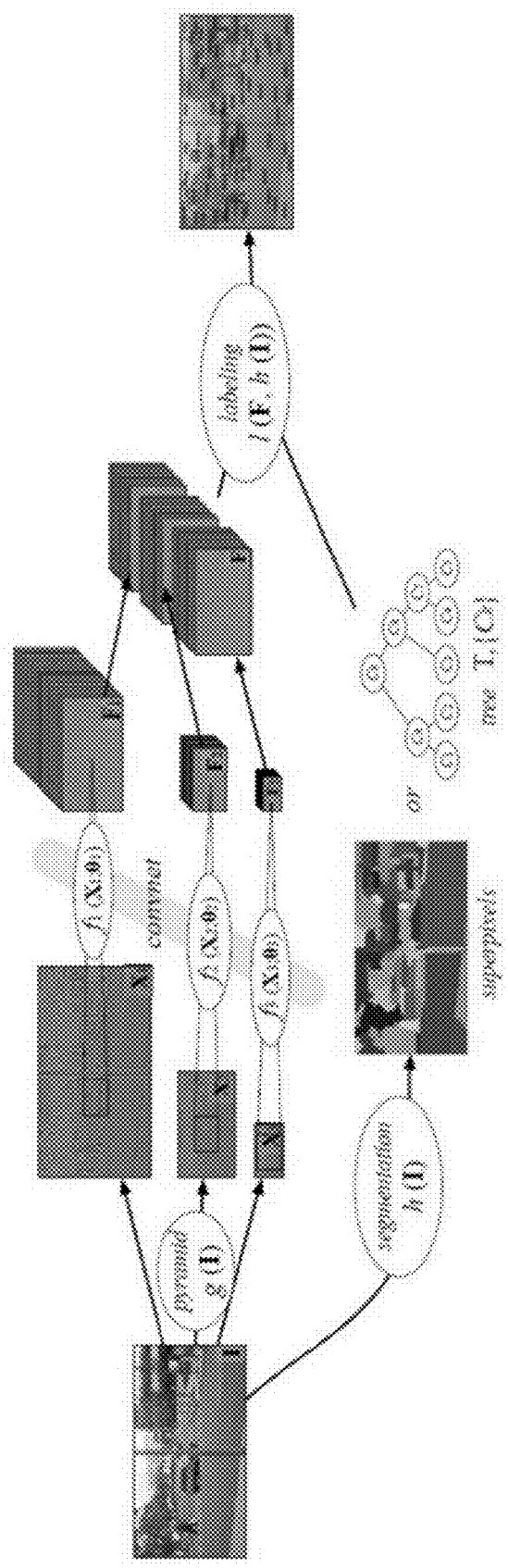
FIG. 4
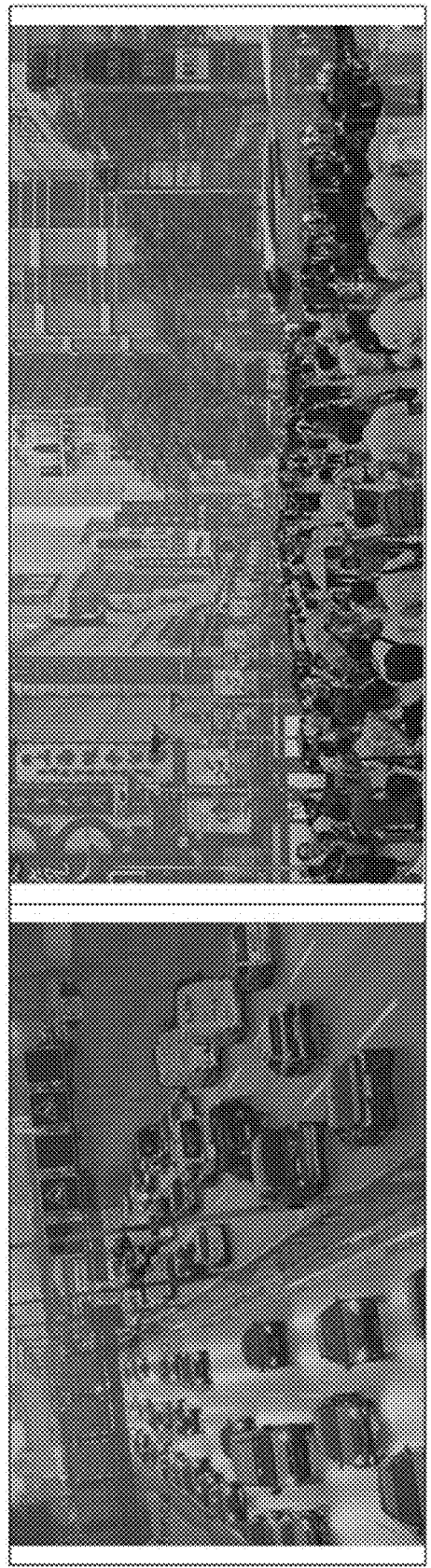
FIG. 5(A)
FIG. 5(B)

ARTIFICIAL INTELLIGENCE BASED GENERATION AND ANALYSIS OF 3D MODELS

CROSS REFERENCE TO RELATED APPLICATIONS

This application claims benefit of priority from U.S. Provisional Patent Application No. 62/511,290, filed May 25, 2017, which is incorporated by reference in its entirety.

FIELD OF THE INVENTION

The invention relates in general to use of artificial intelligence techniques for generation and analysis of 2D and 3D models of objects, and more specifically to use of machine learning and deep learning techniques for analysis of 2D and 3D models generated based on sensor data, for applications such as augmented reality, visualization, and others.

BACKGROUND 3D modeling techniques are used for various applications such as augmented reality, visualization, video messaging and so on. 3D models of objects can be generated from images and data scanned by multi-sensor systems, including cameras and depth sensors. Certain applications such as augmented reality based applications require analysis of multiple 3D objects in conjunction with each other. Artificial intelligence techniques have been used for analysis of images and sensor data. For example, neural networks such as GOOGLENET and RESNET perform image recognition, with very high accuracy. Convolutional Neural Networks (CNNs) have been used for image recognition tasks, exploiting spatial structures (e.g., edges, texture, color), while recurrent neural networks (RNNs) are used for temporal processing (such as with natural language: speech, text). These neural networks have also been used in combination, for example to create text annotations for images. However, conventional techniques have been inadequate to perform analysis of 3D models of objects in association with each other as required for augmented reality and other applications.

SUMMARY

Methods, systems, and computer readable memories comprise instructions for processing imagery, representing a plurality of 3-dimensional (3D) objects. One 3D object is designated as a base 3D object. The system uses 3D modeling to generate a plurality of 3-D models. Each 3D model corresponds to a 3D object from the plurality of 3D objects. A 3D model is represented using one of point clouds or tilings. The plurality of 3D models comprise a base 3D model corresponding to the base 3D object and a set of remaining 3D models. The system extracts features describing each 3D model. The system matches the extracted features of the 3D models to develop a correspondence between the base 3D model and each of the remaining 3D models. The correspondence aligns the 3D objects spatially, so that they are geometrically matched as close as possible. The system geometrically maps each of the remaining 3D models to the base 3D model by overlaying each of the remaining 3D models on the base 3D model to obtain a unified superimposed model. The system extracts numerical tensor features from the 3D models. The system performs match analysis of the remaining 3D models with the base 3D model to determine a metric for each remaining 3D model to the base 3D model. The matching is performed using machine learning based methods and models. The metric indicates a degree of spatial match between the base 3D model and each of the remaining 3D models. The matching utilizes the extracted numerical tensor features from the 3D models. The system generates a 2-dimensional image of the superimposed model based on fused imaging. The system sends the generated 2-dimensional image and the determined metrics of the superimposed model for presentation.

In an embodiment, the system obtains imagery representing at least one of the 3D objects by use of RGB (color) imaging and depth imaging. The system converts the RGB and depth images into a 3D model. In some embodiments, the imagery representing the 3D objects is obtained from an ordinary RGB (color) camera and involves one or more images of each of the 3D objects. The 3D modeling phase involves shape learning through similar shape databases, to convert the 2D imagery to 3-dimensional models.

In an embodiment, the base 3D object represents a human body and the remaining 3D wearable articles. The system classifies each 3D object as a representative of 3D object classes by performing the following steps. The system stores a plurality of 3D models, each 3D model representing a type of human body or portions thereof in a population of users. The system extracts numerical feature tensors from the stored 3D models by taking horizontal cross-sections of the 3D models. The system extracts features such as circumference, area, and volume between cross-sections. The system performs clustering of the numerical feature tensors to segment the stored 3D models into a plurality of distinct clusters. The system classifies an input 3D model to a particular cluster by a proximity analysis to the elements of the cluster cells.

In some embodiments, extracting features comprises, using trained deep neural networks to extract features from 3D/2D inputs. An initial stage of the deep neural network generates generic features from the 3D/2D input and subsequent stages of the deep neural network generate specific features representing regions of interest in the 3D/2D input by analyzing the generic features. The extracted generic features may include sets of tensors representing the corners, edges and points of inflection in the 3D/2D input. The generated specific features may include sets of tensors representing the geometry of unique regions in the input.

In an embodiment, the system trains a deep neural network with training data comprising ground truth information regarding the 3D/2D input. The system periodically updates the training data using new user 3D/2D inputs. The system periodically retraining the deep neural network with the updated training data either online or offline.

In an embodiment, the system uses trained deep neural networks to match extracted features. One or more features may be represented as sets of tensors. Feature matching across a pair of 3D models comprises finding the sets of tensors that have the highest correlation from each of pair of 3D models. In some embodiments, the deep neural network is trained using with training data comprising ground truth information regarding the extracted features and the correlation between them. The system periodically updates the training data using new extracted features and their correlation. The system periodically retrains the deep neural network with the updated training data either online or offline.

In an embodiment, the system geometrically maps a pair of 3D models using trained deep neural networks to orient and overlay the 3D models. The system performs orienting and overlaying the 3D models by finding the transformations that map the matched features and applying the transformations to one or more other 3D models. In some embodiments, the deep neural network is trained using training data comprising ground truth information regarding the 3D/2D inputs, extracted features, the transformation between matched features and the mapped inputs. The system periodically updates the training data using the new user 3D/2D input, extracted features and transformation between matched features. The system periodically retrains the deep neural network with the updated training data either online or offline.

Some embodiments of methods, systems, and computer readable memory storing instructions for methods of processing imagery. The system represents at least two 2-dimensional objects, with one object designated as base. The system generates 2-dimensional (2D) models of each 2D object based on 2D modeling, wherein the 2D model is represented using images. The system extracts features describing each 2D model. The system matches the extracted features of the 2D models to develop a correspondence between the 2D models that relate the models spatially. The system geometrically maps the 2D models and overlays the 2D models, by selecting one 2D model as base, and mapping the remaining 2D models to the base 2D model to obtain a superimposed 2D model. The system performs match analysis of the remaining 2D models to the base 2D model, to determine a metric for each remaining 2D model using a machine learning based engine. The metric indicates how well the base 2D model and each of the remaining 2D models are spatially matched.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

Figure (FIG. 1 shows an overview of the system environment according to an embodiment of the invention.

FIG. 4 shows schematic of a deep neural network-based object detector, and image segmenter, employing multiscale processing, showing promising results.

FIG. 5(A) shows an application of an image segmenter called PSPnet on a traffic scene in Berlin. FIG. 5(B) shows an urban street scene in Hong Kong. This shows strong labeling performance, separating vehicles from the road effectively, and even some sky detected in FIG. 5(A); people, buildings, and foliage separated in FIG. 5(B).

FIG. 12(A) shows some example clothing sizes from Walmart.com, with size labels S, M, and L. FIG. 12 (B) shows some variations on a basic human form, according to BMI (body mass index).

FIG. 14 (B) indicates using level sections of a human body, and considers several metrics: volume between sections, surface area between sections, and the circumference of the sections.

FIG. 34 illustrates a visualization of the cluster cells of the 12 body shape types after height normalization.

Figure 1:
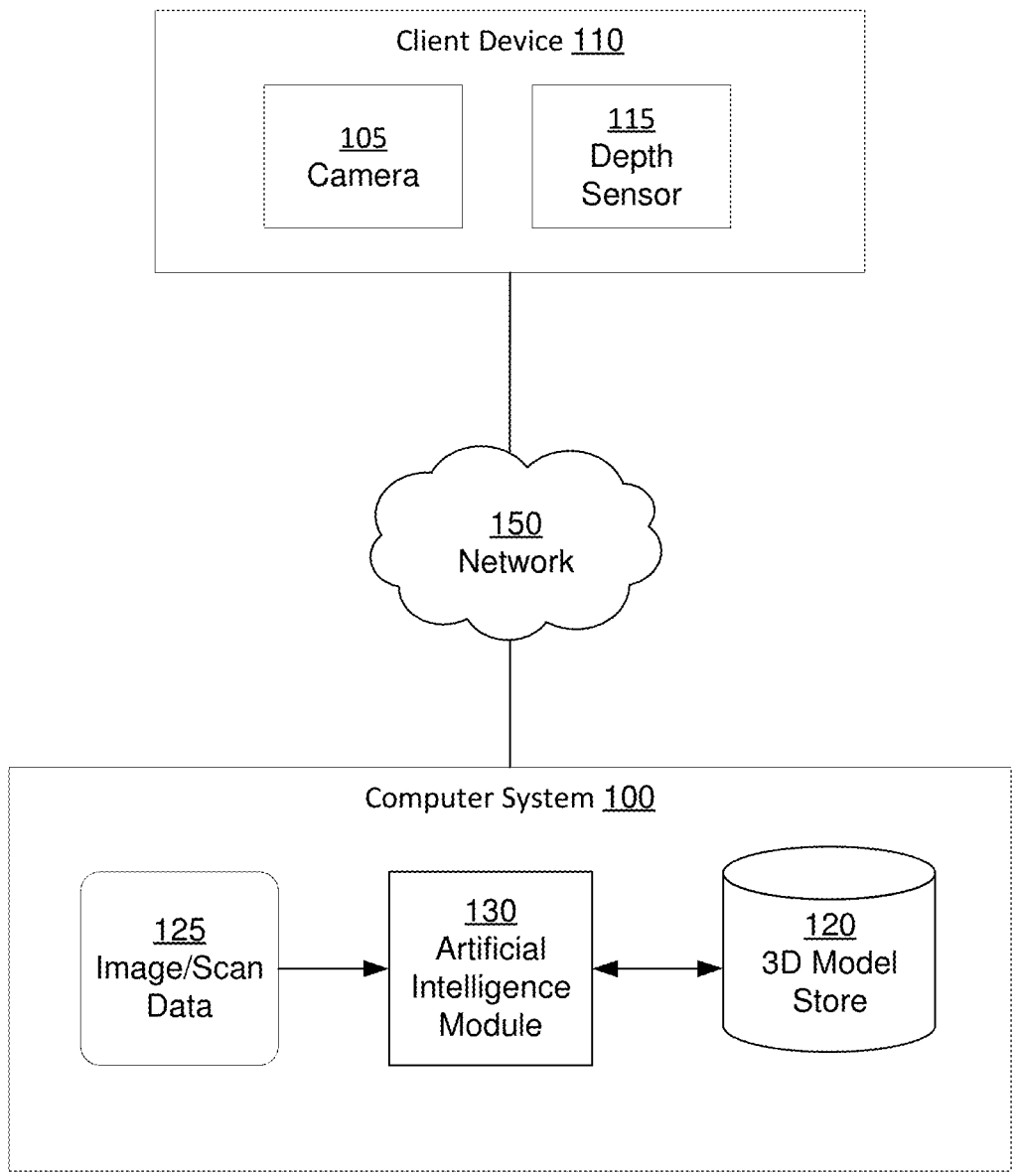

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The technologies for three-dimensional scanning have been developed and known for at least two decades. Moreover, practical three-dimensional body scanners have been in widespread use at least since 2007 at airports, replacing older metal detectors. These use one of two common imaging technologies: millimeter wave imagers, such as the very common L-3 ProVision scanner, which uses sub-visible light frequencies to penetrate through clothing; and backscatter x-ray imagers, such as used in certain airports, for example. Both of these sensor system types are active imaging technologies (and both may have health risks associated with them, which are currently under study). Moreover, due to the sensitivity of exposing the traveling public to being seen disrobed in mass numbers, the US has mandated the use of so-called "automatic target recognition" software to recognize the contours of the body as well as any additional significant objects and present a cartoon version of the person to the security personnel, along with any detected threat objects.

The airport-grade scanners are unsuitable for consumer applications for obvious reasons. But conventional techniques of virtual dressing lack a reliable, quantitative fitness analysis of the wearable article on the user, which is key to developing confidence in the fit virtually.

Overview of the Invention

The problem addressed herein in 3D shape analysis is the following: given representations of two or more compact, 3D objects, develop methods to provide: (a) a representation of the objects overlayed; and (b) provide a metric of how well the objects match each other. The system applies techniques of AI, as well as algorithmic techniques such as edge detection, clustering, and statistics applied to databases, to solve this problem. As an illustrative example, consider that the compact, 3D objects are a user, and of a wearable article. Embodiments of the invention provide (a) a representation of the user with the wearable article on, and (b) a fitness quality estimate of the wearable article for the user. The input and output representations of both objects (e.g., the user and wearable article) can be just 2D images, plus any additional size measurement parameters such as height, weight, chest, waist, or hip size; or they could be 3D scans.

Embodiments of the invention utilize both 2D and 3D techniques. The system leverages artificial intelligence (AI) based techniques such as deep learning, databases of 3D human shape models, algorithmic techniques such as edge detection, and other 2D and 3D mapping and analysis techniques, to solve this problem. The disclosed techniques provide for a new, systematic classification or labeling of the class of 3D objects in question (e.g., both the user, and wearable articles). For further illustrative purposes only, details of the wearable article application are disclosed, without limitation to the scope of the invention.

The recent advent of accurate, affordable, and private 3D modeling of a person is a new opportunity in many areas, including in the online presentation of a wearable article, in that it can allow two things: a 3D fitness quality model of a wearable article to a user, and a virtual draping of a wearable article on the user. This can greatly assist online wearable article transactions. Further, the use of 3D shape modeling as a basis for wearable article selection also leads to a rethinking of how clothes can be labelled for size in the first place. Instead of Small, Medium, and Large, the system uses a finer segmentation of the class of body shapes of the general population, leading to much more accurate wearable article labeling, as well as easier and more reliable online wearable article selection. Finally, deep learning can be further utilized to show the selected wearable article on the user, completing the entire wearable article selection process virtually.

At least since the introduction of the Microsoft Kinect in November 2010, the key sensor technology required—depth sensing—has been available in a compact and highly affordable package, leading to a host of new applications. Anyone who has passed through an airport security line has encountered body scanners that can detect objects worn upon a person; in particular, they can take an accurate scan of a human body. But this is bulky, expensive equipment, used by governments. The availability of accurate, affordable, and private 3D body scanning and modelling of a user can provide both the basis for innovative new standardized labelling of clothes by 3D size codes, as well as the mechanism for its size-fitting selection and sale, providing the user with the confidence that the purchased item will indeed fit her the way she wants.

Many consumer depth cameras are available, from Kinect, the Intel RealSense, and the revised Amazon's Echo Look. Therefore, the disclosed embodiments use such sensor hardware. Some embodiments perform 3D mapping of a user with only a single, compact, RGB camera (such as on every smartphone, tablet and laptop), without depth sensing, but using deep learning technology and pretrained models. Embodiments deploy such compact, low-cost sensor systems to develop 3D models of users, with or without depth sensing. Moreover, the system stores a library of anonymous user 3D profiles, and discretizes them into a limited set of 3D body types, using clustering techniques such as vector quantization, support vector machines, and other AI and deep learning techniques. This same set of codes or coding methodology applies both as innovative wearable article size labels, as well as to characterize a user body type. Typically, a user may need separate codes for upper body, torso, and lower body types. Men, women, and children will differ in the types of appropriate coding.

Embodiments of the invention utilize ordinary digital video sensor systems, optionally also incorporating commercially available infrared depth sensors. This technology can be used in various virtual and augmented reality applications. The 3D models allow video games to have a realistic avatar of individual players. Similarly, the 3D modeling allows digital movies to include the user in a starring role, for example allowing you to slay the dragon, rescue the girl, and get the kiss. In future movies like La La Land, the user can dance with the star Emma Stone in their home theater. And these techniques allow enhancing of video messaging to have many of these same elements, mixing live and stored media elements for truly rich messaging. Many applications are also possible in business, government, and entertainment.

Further Elaboration of the Invention

The following US Patent Applications and patents are incorporated by reference herein: Ser. Nos. 15/698,410, 62/384,532, U.S. Pat. Nos. RE44743, 8,520,736, 9,524,028, and 9,829,984. The system makes use of deep learning techniques, as described herein.

FIG. 1 shows an overview of the system environment according to an embodiment of the invention. The overall system comprises one or more client devices 110, a computer system 100, and network 150. The client devices 110 may be mobile phones, computers, laptops and so on. The client devices include sensors, for example, a camera 105 and/or a depth sensor 115. The depth sensor is optional. In some embodiments, multiple client devices may be used, for example, each with a camera and/or depth sensor, allowing multi-view, and may record video. The computer system processes the imagery and scan data generated by sensors of the client device and received from the client device. The data may be transmitted between the client devices and the computer system 100 via a network or using a direct connection. In some embodiments, the computer system may be the computing capability of the client device itself, the network being the internal wired connection. The computer system 100 receives images/scan data 125 of 3D objects from the client devices. The artificial intelligence module 130 of the computer system 100 generates 2D/3D models for the 2D/3D objects, stores them in the 2D/3D model store 120, extracts features (which can be geometric points, vectors, or tensors) from 2D/3D models, matches the features, generate metrics representing 2D/3D object association score, maps the features and produces a fused image of the 2D/3D models. The computer system 100 is also referred to herein as the system.

Figure 2B:
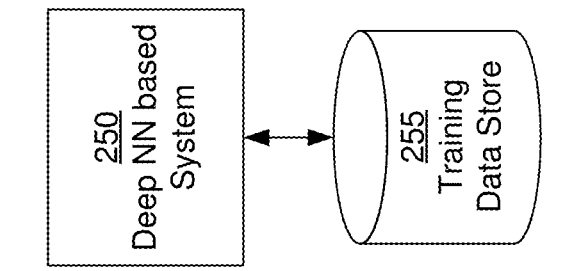
FIGS. 2(A) and 2(B) show system architecture of an artificial intelligence system according to an embodiment of the invention.
Figure 2A:
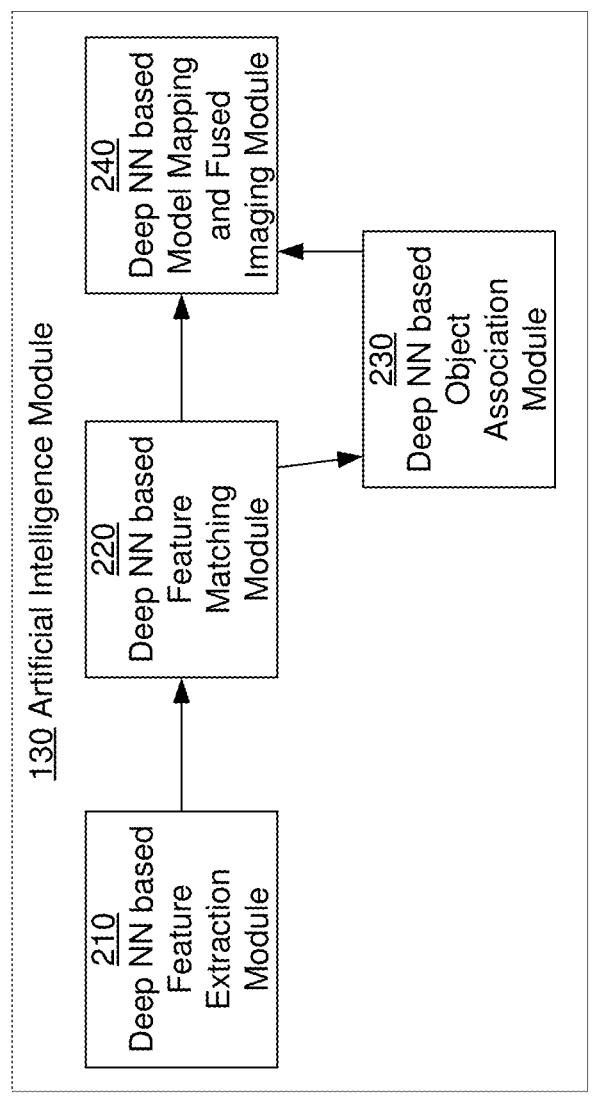

FIG. 2(A) shows a system architecture diagram of the artificial intelligence module 130, according to an embodiment. The artificial intelligence module 130 comprises four sub-modules, each a deep neural network (DNN) based system having its own training methodology and training data store (see FIG. 2(B)). The DNN based feature extraction module 210 extracts features (geometric points, vectors, or tensors) of 2D/3D models. The DNN based feature matching module 220 matches the features to develop a correspondence between 2D/3D models to relate them spatially. The DNN based object association module 230 performs match analysis of the 2D/3D models to determine a metric indicating how well the 2D/3D objects are spatially matched when superimposed. The DNN based model mapping and fused imaging module 240 generates a 2D/3D image of the superimposed objects. The system generates a unified superimposed model based on the 2D/3D images of the superimposed objects. In other embodiments, the artificial intelligence module 130 has more or fewer or different modules than those shown in FIG. 2.

FIG. 2(B) shows the architecture of each deep neural network based system, as depicted in FIG. 2(A), according to an embodiment. Each Deep NN based system 250 has its own associated training data store and training methodology. The deep NN based system 250 is trained using the trains data sets stored in the training data store 255. The training data sets stored in the training data store 255 may be updated on a periodic bases and the training of the deep NN based system 250 repeated periodically.

Deep Learning (DL) and Artificial Intelligence (AI)

CNNs are used to perform image recognition tasks, exploiting spatial structures (e.g., edges, texture, color), while recurrent neural networks (RNNs) can take on tasks that involve temporal processing (such as with natural language: speech, text). These network types can also be combined, in sequence, for example to create text annotations for images. For the task for scene labeling in video data, some combination of these two architectural types is also directly merited, but more complicated than say for image annotation (where the information itself is static in an image, only the annotation requires natural language, which is not static but involves temporal processing). Despite the success of the image-based methods mentioned so far, to date there has been limited work in truly video-centric processing for visual recognition tasks. The term artificial intelligence is used to refer to algorithms that incorporate machine learning based techniques, for example, neural networks in the signal processing scheme but is not limited to this usage.

CNNs, RNNs

Figure 3A:
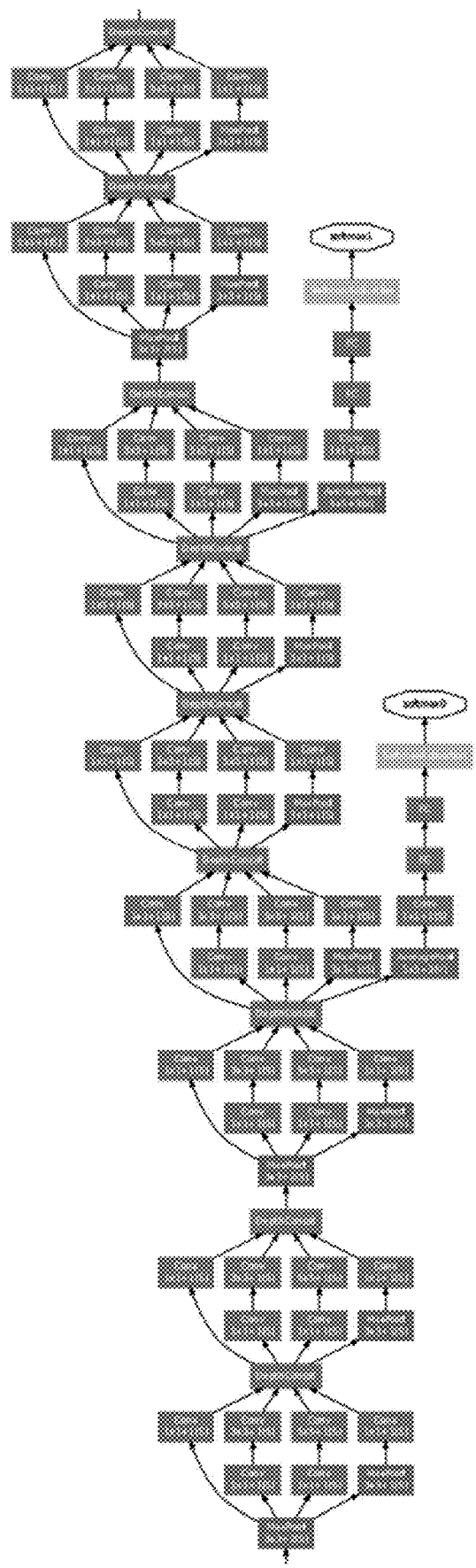
FIG. 3(A) illustrates an example (GOOGLE's Inception) deep neural network conceptual layout, showing both sequential and parallel elements. This technology launched the AI revolution.
Figure 3B:
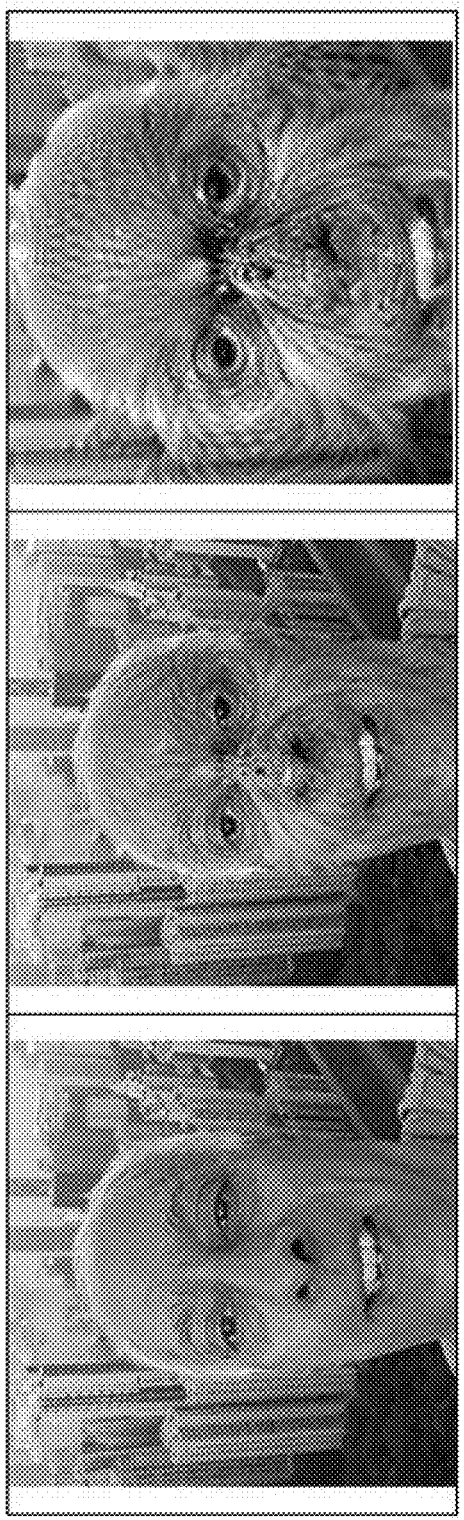
FIG. 3(B) shows results of execution of an example neural network (called deep dream) using TENSORFLOW, w/ the proposer's image in Hong Kong as seed, a stark model of real dreams, indicating parallels between deep NNs and animal visual cognition.
Figure 3C:
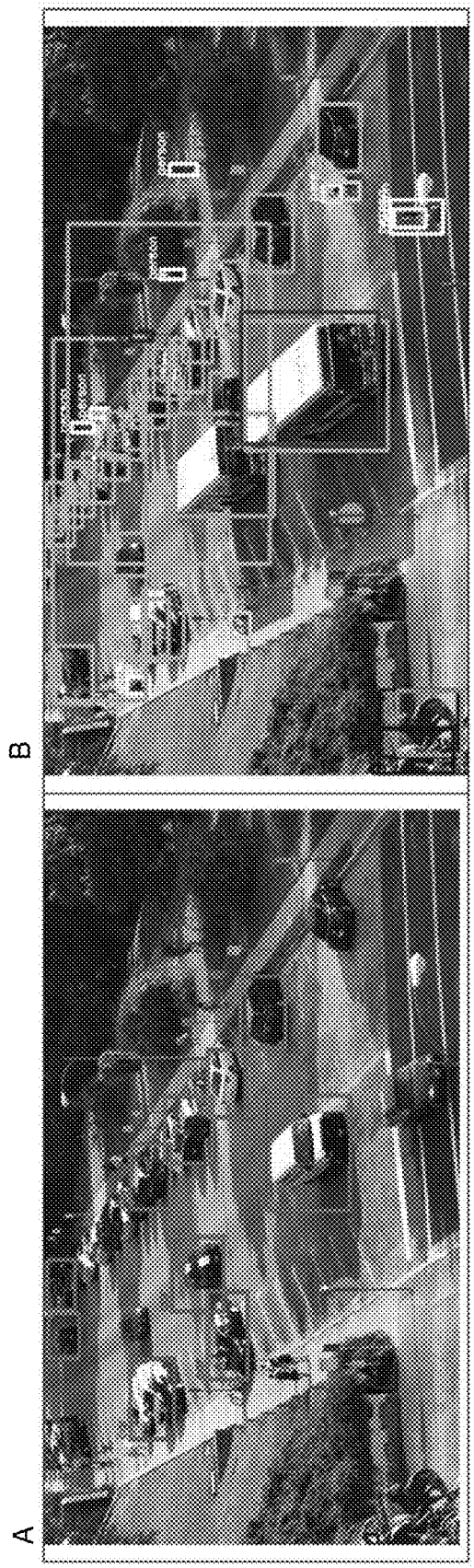
FIG. 3(C) illustrates deep neural net-based object detection. Left, the figure shows modest performance when a NN model is applied without appropriate retraining. On the right, an improved approach using a refined model shows promising results.
Figure 6:
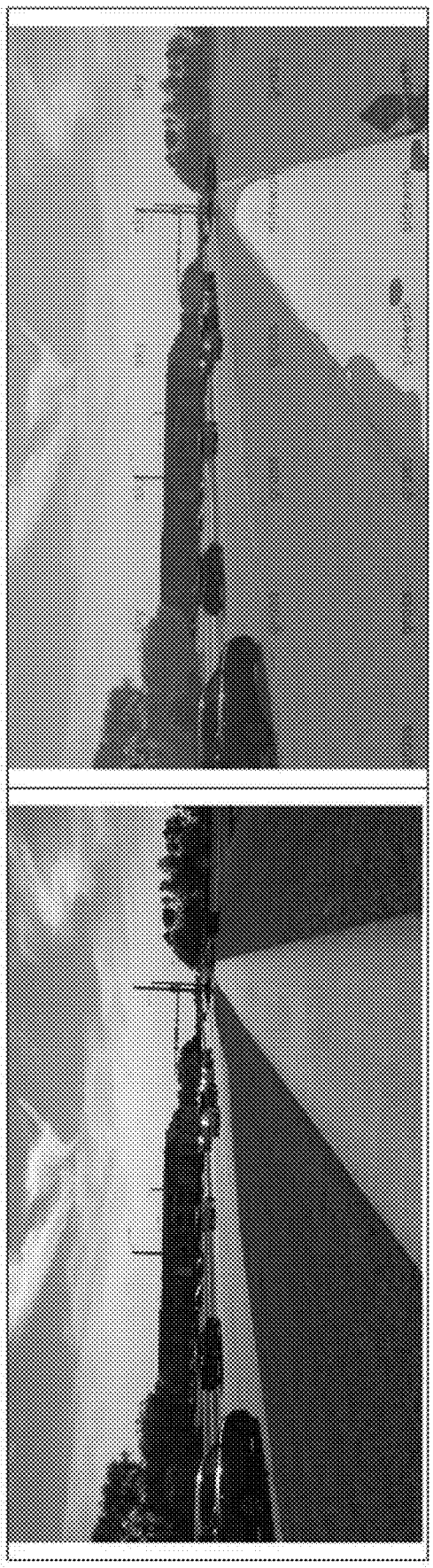
FIG. 6 shows an application of PSPnet for segmentation, on a street image acquired in Melbourne, Fla., showing excellent performance detecting cars, while distinguishing road, grass, sidewalk, buildings, and sky. Real-time processing is possible on modern GPUs.
Figure 7:
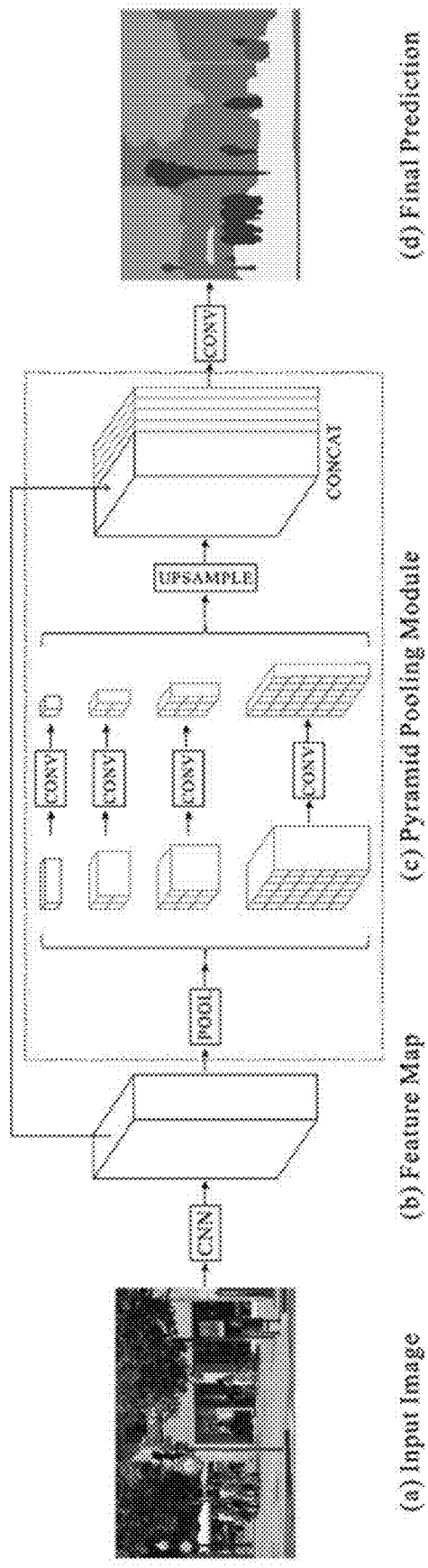
FIG. 7 shows an overview of PSPnet neural network architecture, showing convolutions and pooling in a multi-scale setup. Features from different layers are concatenated, and a final Cony predicts pixels.

An example CNN is conceptually pictured in FIG. 3(A). CNNs can be used for (FIG. 3(B)), creating dreamlike images starting from captured ones, by flowing slowly in output parameter space away from a given classification. Based on training on the Imagenet data with 1000 classes, one can apply it to recognize common objects in images accurately. See FIG. 3(C).

There are many Inception-inspired variants that are more robust for tasks performed by computer system 100, for example, YOLO (You Only Look Once). Effectively, one aspect of looking for objects all over an image is how to interrogate the different portions of an image efficiently. Many algorithms repeatedly cover various regions; YOLO is especially efficient.

Embodiments of the invention use NN architectures such as PSPnet (FIG. 4), and consider PSPNet as a baseline approach for scene labeling (as well as object detection within it). Two metrics are commonly used in scene labeling/object detection: PixelAccuracy %, and Mean of Intersection-over-Union (mIoU) % —this is based on computing the Area(Int)/Area(Union) for the predicted and actual bounding boxes for detections, and averaging over objects detected.

ResNet and Related Models

ResNet uses identity shortcuts that jump between layers (whose gradient is thus close to 1 rather than 0), speeding information flow as well as training time, increasing depth, and adding performance, by overcoming vanishing gradients. While training/testing error tends to rise with depth in plain networks, ResNet showed it falling with increasing depth; see FIG. 8.

Figure 8:
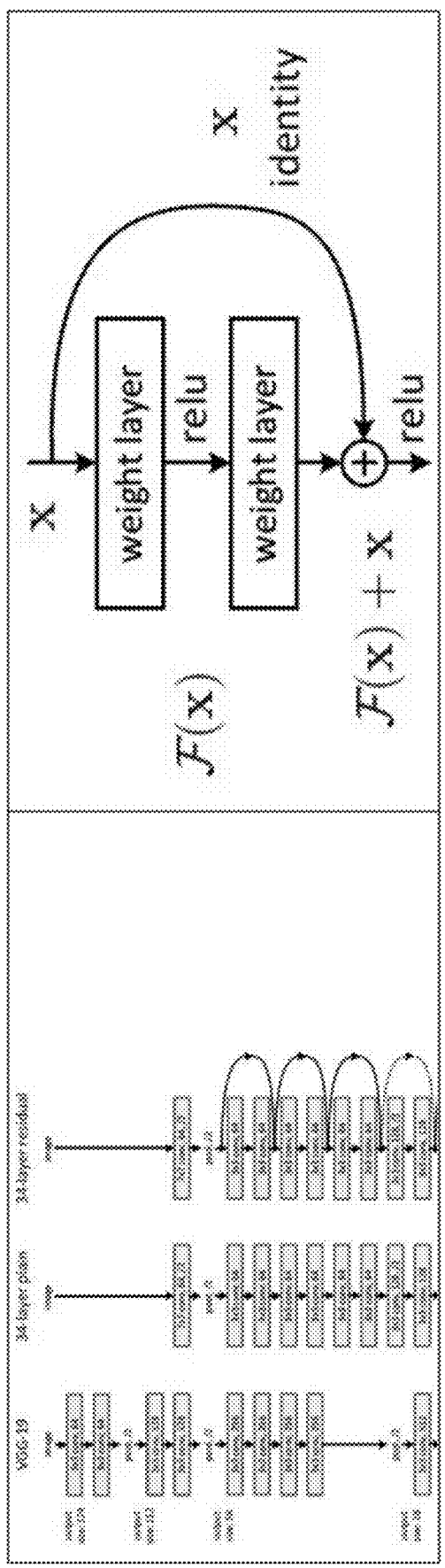
FIG. 8 illustrates comparison of VGG, plain CNN, and ResNet models. Compared to standard CNNs, VGG focused on just the 3×3 convolutions, but used more depth (compared to prior models), and used more channels (e.g., up to 512). ResNet added an identity shortcut, improving training.

Note that the PSPNet model, is built on top of ResNet, where the deepest model performs best; see FIG. 8. Embodiments of the invention use the PSPNet50 model. But any effective neural network model can be used as the base, and its variants may provide different performance values, especially on IR data. And while ResNet itself dispensed with dropouts, which have been useful in other CNN research for combating overfitting and thus boosting performance, however something like dropout (where a certain fraction of NN nodes are randomly disabled in training), which normally serves as a regularizer against overfitting, can still be effective. In fact, another approach—"stochastic depth", in which entire layers are statistically eliminated, results in shortening rather than thinning networks, while improving robustness.

Video-Centric Processing, Temporal Feature Flow, and TLD

Effectively, all NN detectors discussed above, including YOLO, PSPnet, built on ResNet, are image-based detectors. But a key aspect of video is the temporal flow of information (e.g., motion) between successive frames, untapped. This temporal flow aspect is exploited to the fullest in such common applications as video compression, where block-matching motion estimation (BMME) is a central task of an encoder. In fact, video compression has been a key contributor to the state-of-the-art in BMME. Motion estimation (whether block-based and fully optimized, or the finer but much less optimized pixel-based approach as in optical flow) is utilized here as well, so that the system can simultaneously (a) achieve smooth, consistent detection and recognition of objects and features across frames, and (b) reduce detection processing at every frame, wherever possible.

According to various embodiments, incorporation of temporal flow of information is done within the neural network framework itself, or externally as pre/post processing modules. Example methods for incorporating temporal processing within the NN are used in the design. Example methods for using pre/post processing model this on video compression technology incorporates image coding. First, a temporal prediction engine uses motion estimation, creating predicted frames.

To take advantage of motion flow, consider applications analogous to video data compression, in which a coding structure is used in which key frames, occurring at regular intervals (such as 16 frames) are coded independently (in our framework, are fully NN labeled), while in between frames are predicted according to flow. While video coding uses block-matching motion estimation, in this case, the system needs to refine that to pixel-level flow (e.g., optical flow), where pixel classifications are predicted forward in time. Even within such predicted frames, if new objects appear in blocks detected as new motion blocks, or blocks of poorly classified pixels, the neural network object recognizer can be triggered for such blocks, again analogous to I-blocks within predicted frames.

One useful tool, (e.g., disclosed in U.S. Pat. No. 9,829,984 which is incorporated by reference herein), is Tracking-Learning-Detection (TLD). By performing all three functions, robustness of detection is achieved, which overcomes rapid variations such as changes in size and aspect angle for continuous detection. Moreover, TLD performs in real-time on a CPU alone. Embodiments of the invention use both TLD-based methods for feature tracking, as well as the neural network-based approaches, to achieve best overall performance. In analogy with video coding, the systems use key frames where image-detectors are applied, predicting frames in between where objects/pixel predictions are tracked, but some blocks can still use detection (I-blocks).

Figure 11A:
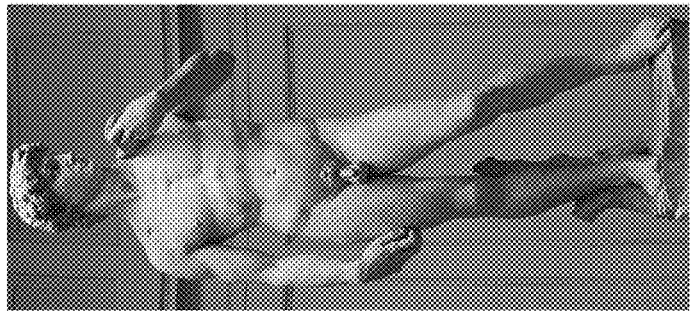
FIG. 11(A) illustrates Michaelangelo's David, a masterpiece of human form.
Figure 11B:
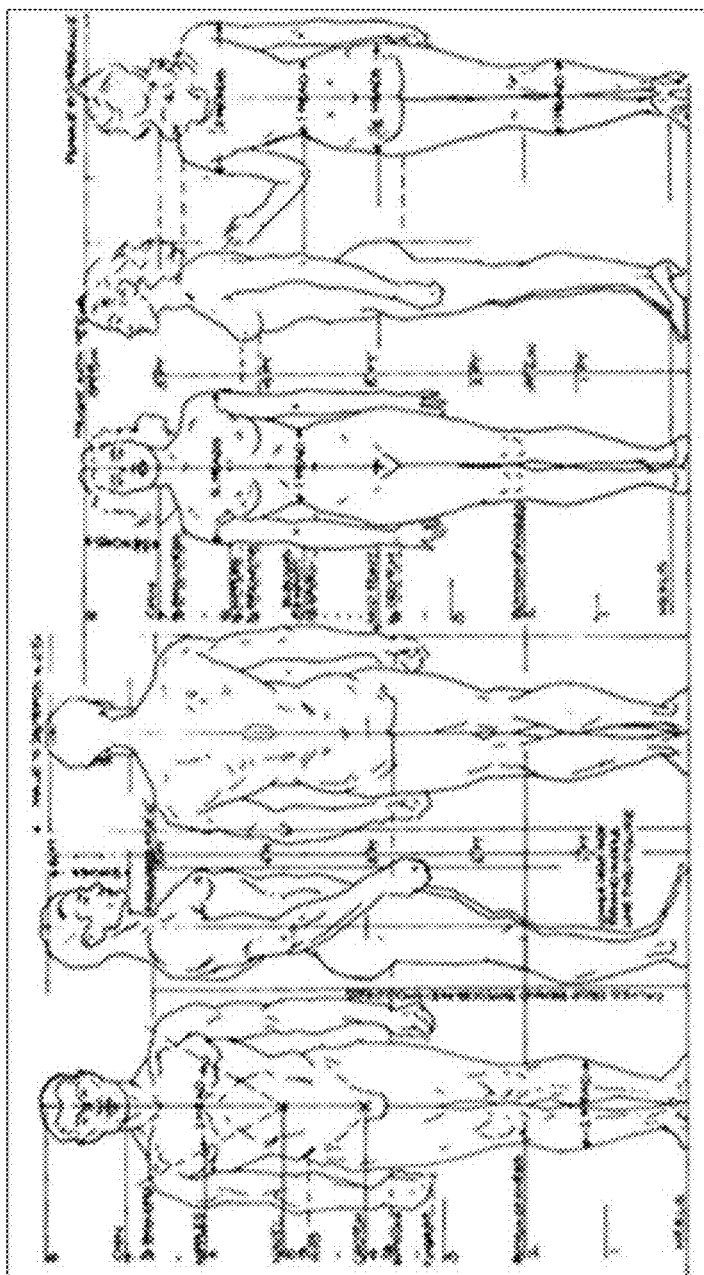
FIG. 11(B) illustrates ideal body proportions, for male and female, which relate dimensions to head size.
Figure 11C:
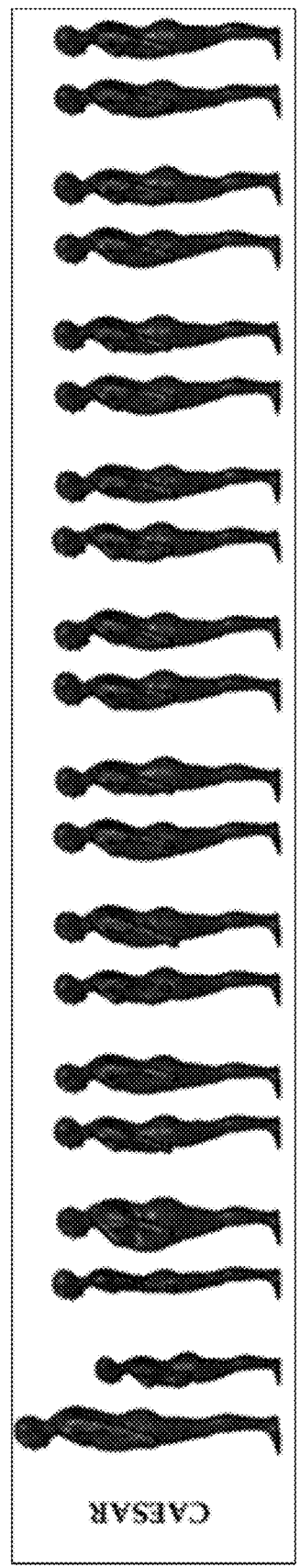
FIG. 11(C) illustrates top 10 principal components of 3D models of an adult.
Figure 13A:
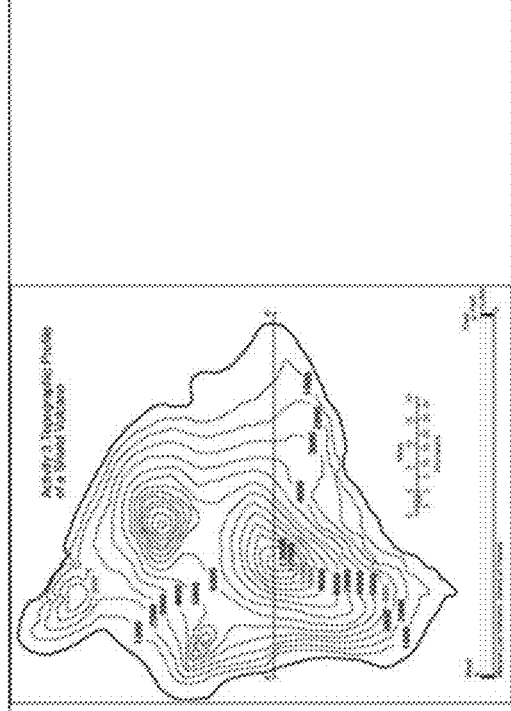
FIG. 13(A) shows contour map of the Big Island of Hawaii.
Figure 13B:
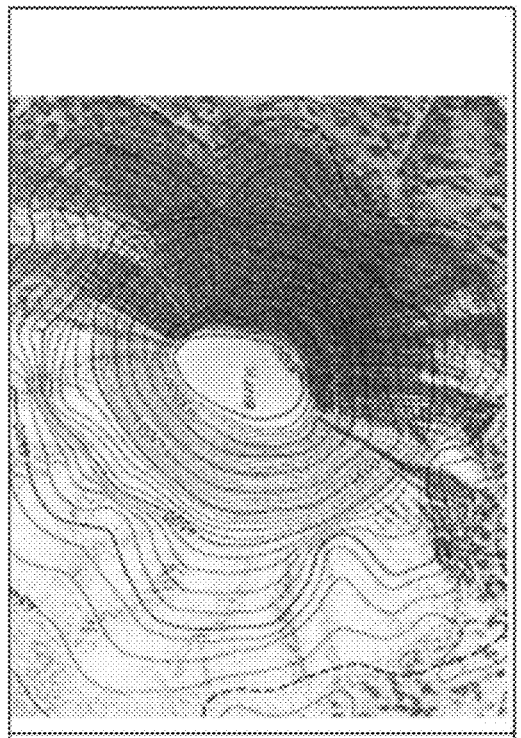
FIG. 13(B) shows contour map of the Devil's Tower. Contour maps immediately provide an intuition of the local topography. It also works in measuring people.
Figure 13C:
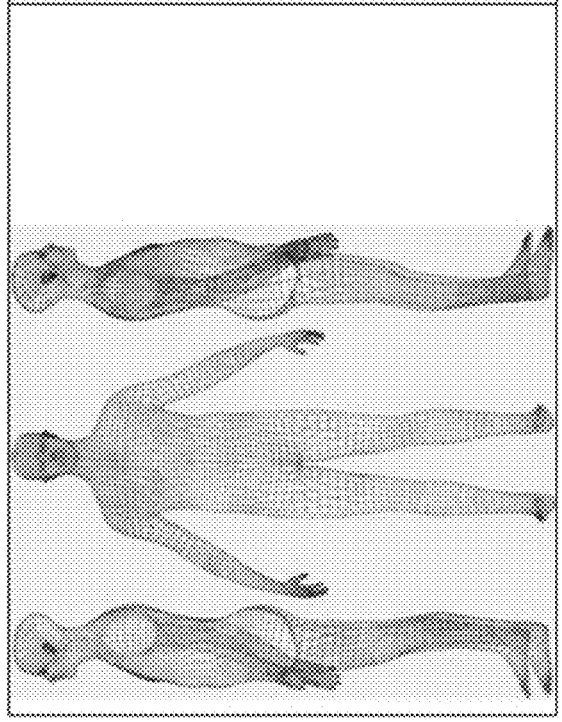
FIG. 13(C) shows contour maps of people produced by the mPort mPod technology.
Figure 13D:
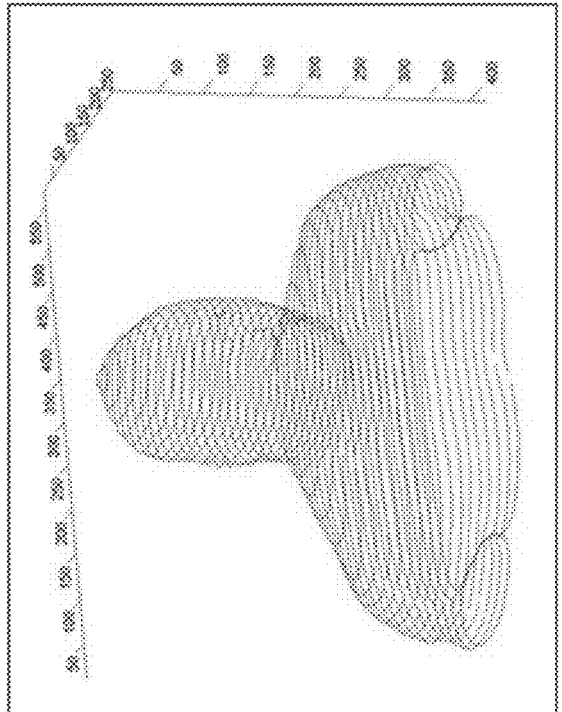
FIG. 13(D) shows a detailed map of a head-and-shoulders region by another technology. The horizontal contours on the body are precise the level sets of the height function, which is the same as in topography.

Human Shape, Models, Measures, and Metrics, with Application to Wearable Article The human body is the subject of much art through history, and there is a sense of the ideal human form (e.g., Michaelangelo's David), for men and women. The head size is a reference for the body, see FIG. 11. The actual human form, as determined from acquired databases of human shapes, is somewhat different. A principal component analysis using the top 10 components shows some of the "degrees of freedom" of the human form. The first two components are recognizable as height and weight variables, while gender is mixed into all components (mixed population). Accordingly, the system may use gender, height, and weight as among the most discernable variations in the population.

One industry that needs to take human body shapes directly into consideration is the wearable article industry. While there is a continuous spectrum of human body shapes in the population, the mass wearable article industry necessarily targets a discrete set of sizes, typically labeled as small, medium, large, which correspond to some specific parameters (but which vary by vendor/maker). Embodiments of the invention standardize shape models directly as size labels, and use shape-based fitness quality models. The disclosed system provides a bridge from the current S/M/L labeling scheme.

Figure 39:
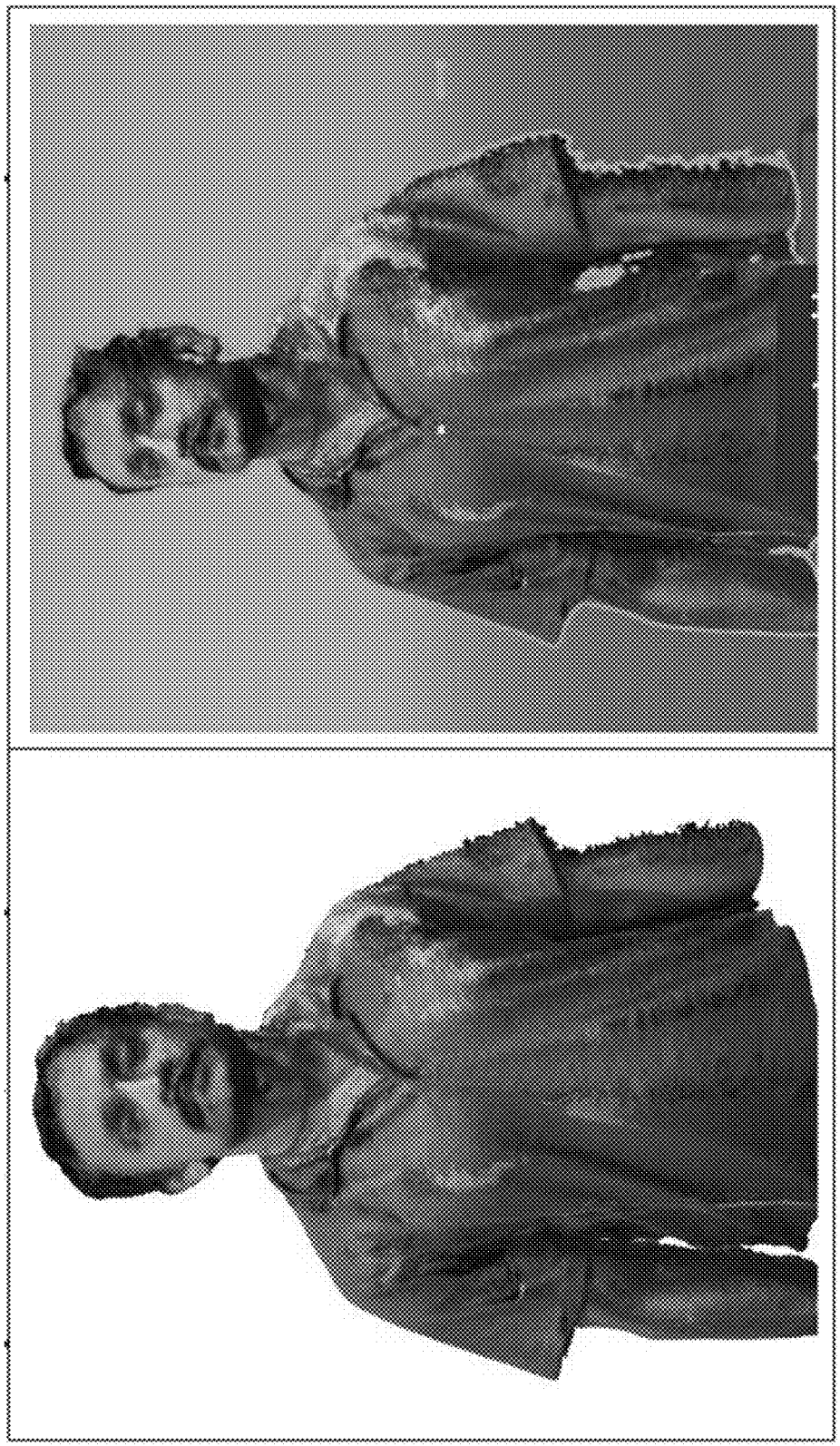
FIG. 39. 3D scan of a user using Microsoft Kinect image and depth sensor system, and its 3D Scan software.

In an embodiment, the system represents a 3D model of a person using a set of points in 3D (point cloud), annotated with color, as well as associated meshes, with texture overlayed. Well-established algorithms can convert the image data from an RGB+depth sensor system to a point cloud or mesh representation; FIG. 39 shows an example. The more points in the cloud, the denser the mesh, and the finer the texture, the better but more complex the representation. Examples show that point clouds approaching 1M colored points on a person look realistic. The system uses databases of adult human 3D models to finely segment the population according to body shape. The system uses 3D models of wearable articles as well to drape wearable articles on 3D human models. Finally, by comparing the wearable articles and human 3D shapes, the system generates shape-based fitness quality metrics for the wearable article on the user.

Embodiments of the invention use methods of sampling the geometry of a body, for example by using the level set topography of a body (and wearable article) to measure the length of N(=25-200) contours of the body at various cross-sections. In some embodiments, the system further complements the contour measurements with additional measures such as volume or surface area between contours, or other sampled geometric tensors which capture the shape of the body. The system determines a finite set of numbers for a first 3D object representing a body and a finite set of numbers for a second 3D object representing a wearable article. The numbers represent vectors or tensors in Euclidean space $R^N$. The system determines differences between corresponding points of the two 3D objects, and uses metrics such as: L2 (Euclidean Dist.), L1, Linfinity, as well as other algorithmic quantities such as the components of the tensor difference (e.g., the difference in contour lengths or other measures). Moreover, such algorithmic quantities, when combined with trained coefficients using deep learning, and databases of known user shapes and reported fitness quality assessments via an app, provide robust estimates of fitness quality with increasing reliability. This is analogous to the DL video multimethod assessment fusion (VMAF) video quality metric developed by Netflix for streaming video. A robust, virtual fitness quality assessment is a key enabler in virtual dressing room applications, by providing the needed confidence in selection. In some embodiments, the system assumes that contours of the wearable article exceed the body contour size by certain thresholds. In some embodiments, the system may assume that contours of the wearable article are the same or smaller than the body contour size when representing tight wearable articles designed to shape the body.

AI-Based 3D Body Modeling and Model Fusion, with Application to Wearable Article Embodiments of the invention use AI based tools to visualize and measure fitness quality of a wearable article, envisioned as a mobile app. Given input images of a user and of a wearable article, along with additional data such as user gender, height, and weight, traditional size data on the wearable article, and given prior knowledge of body shapes of the general population, the system generates a 3D model of a user's body, as well as of selected wearable article. The system further provides: (a) a metric of fitness of the wearable article to the user; and (b) an image of the user wearing the wearable article.

Figure 9:
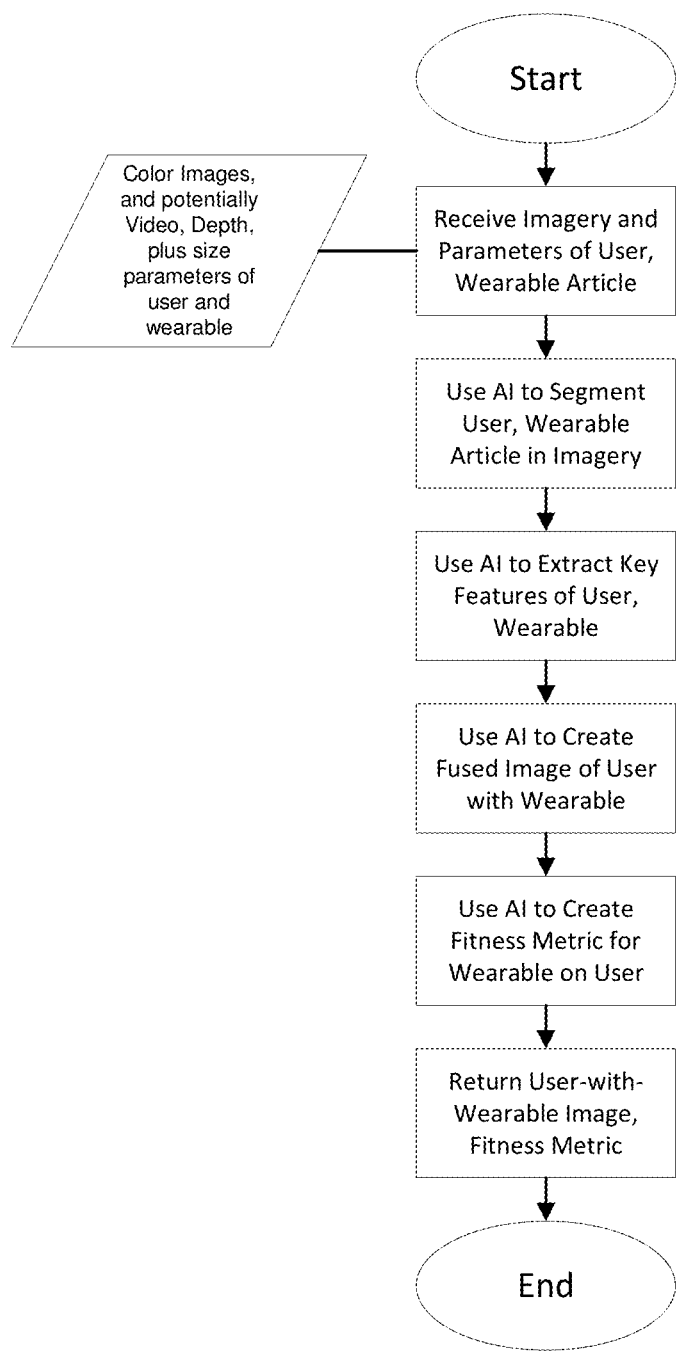
FIG. 9 shows a flowchart for AI-based wearable visualization and fitness analysis, according to an embodiment of the invention.
Figure 10:
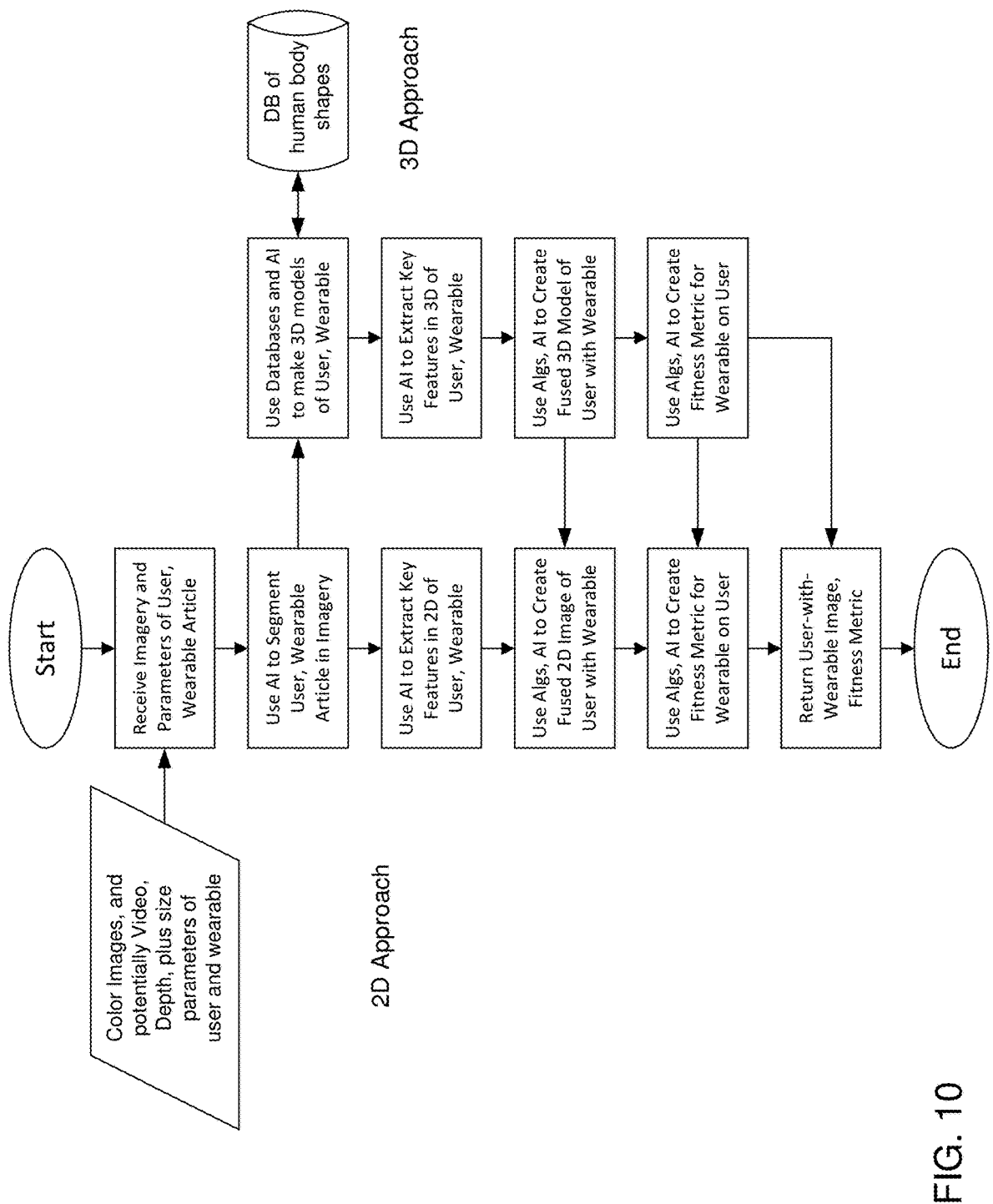
FIG. 10 shows a flowchart of interlinked 2D/3D image processing methods according to another embodiment of the invention.

There are two problems addressed in fitness quality analysis and image fusion, which are closely linked but still require somewhat different techniques, outlined in FIGS. 9, 10. (1) [2D] In an embodiment, given a 2D user image, and a 2D image of a wearable article, the system generates an image of the wearable article on the user, and a metric of fitness of the wearable article on the user. (2) [3D] In another embodiment, given 2D user images of a user and a wearable article (as above), the system uses 3D databases of models of people and wearable articles, together with model estimation techniques, and generates a 3D model of the user and the wearable article, drapes the wearable article on the user, and generates a 3D model of the user with the wearable article. From this, the system develops both a 2D image of the user with the wearable article on, as well as a fitness quality metric of the wearable article for the user.

2D Image Processing with Application to Wearable Article

The system performs following steps to drape a 2D wearable article image on the 2D frontal user image (see FIG. 10): (1.) Determine key features on the edges of the 2D body image. (2.) Determine key features on the edges of the 2D wearable article image. (3.) Map texture from 2D wearable article image to 2D body image using the key features.

Key Features of 2D Body Image

Figure 15:
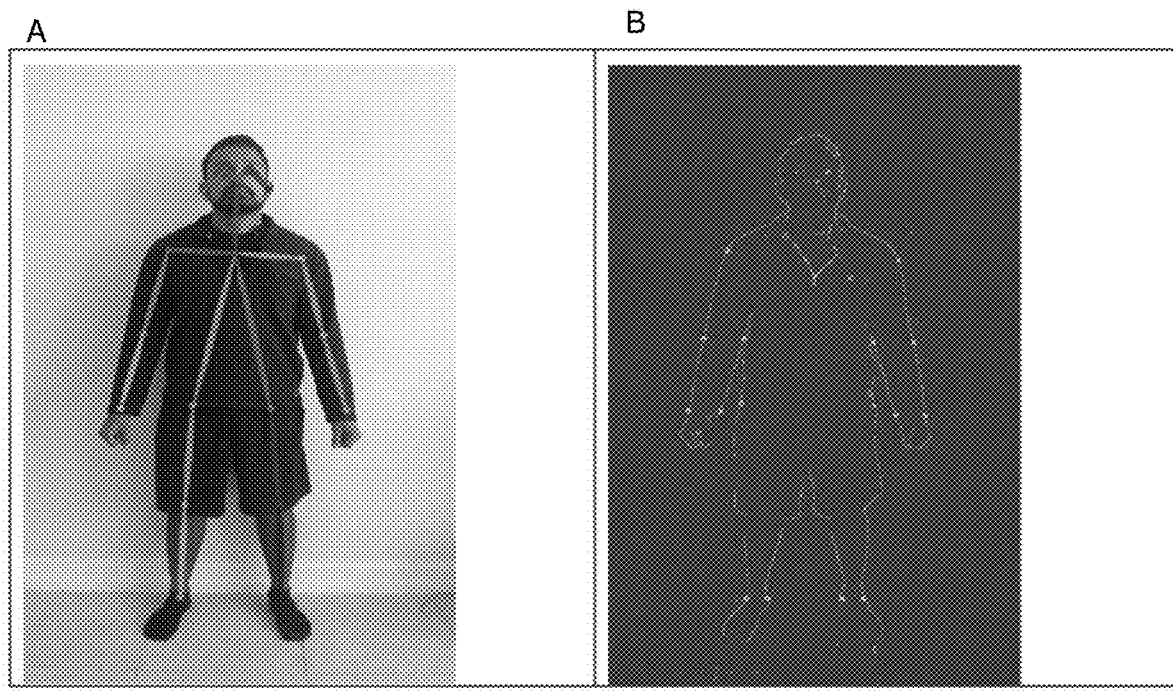
FIG. 15(A) shows a 2D body image, with key points identified using a trained deep CNN.
FIG. 15(B) illustrates edge detection of the body, with key edge points, now migrated to the edges using a neural network or simple algorithms (e.g., horizontal intercepts along the boundary edges).

In 2D, key features are points. Embodiments of the invention use human 2D pose estimation to identify anatomical key points on the 2D image as shown in FIG. 15(A). A multistage CNN is utilized to identify the key points. Given a 2D color image of a user as input the network predicts a set of 2D confidence maps of body part locations and type. Then, an edge detection algorithm, for example, a canny edge detection algorithm is run on the same 2D image to detect the edges on the image as shown in FIG. 15(B). The system uses the key points corresponding to the shoulders, elbows, wrists, hips and ankle from the CNN based pose estimator to find the corresponding points of interest on the edges. In various embodiments, the system performs migration from internal key points to edge key points using trained neural networks, or algorithms such as horizontal migration to boundary edge. This is shown as ovals in FIG. 15(B).

Key Features of a 2D Wearable Article Image

Figure 16:
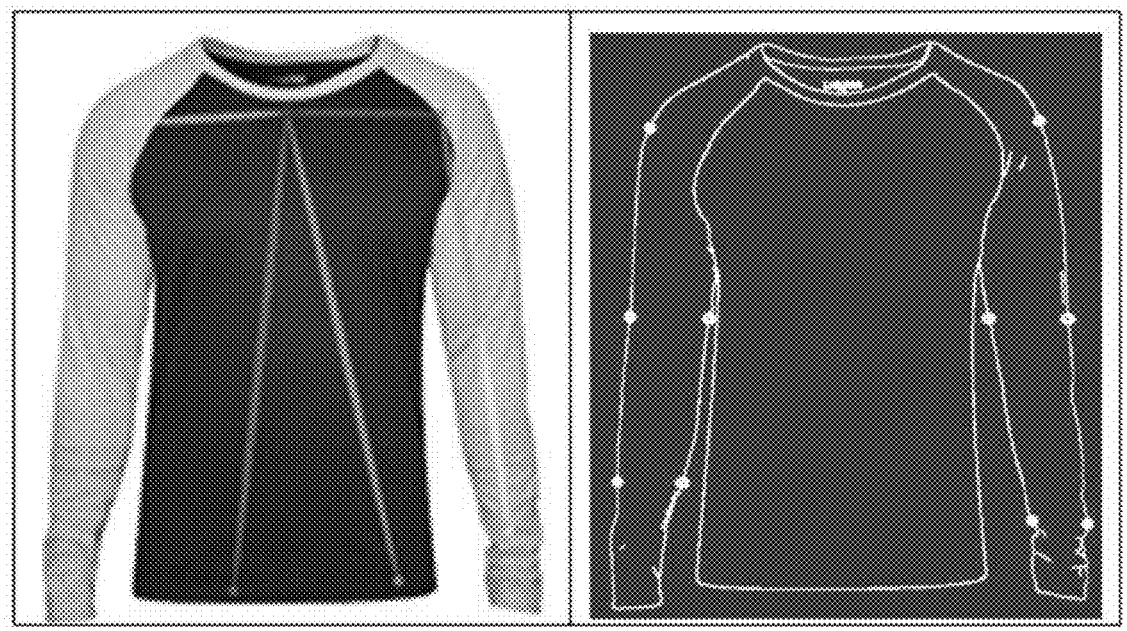
FIG. 16 shows key points processing of a garment image (example of shirt), using a similar trained CNN to find internal edge points, and then edge detection and migration of those points to the boundary edges, exactly as in the processing of body images.

The system trains a CNN based 2D pose estimator to identify key points (shoulders, neck, elbows, wrists, waist, inseam, knee and foot) on wearable articles for both the upper and lower body like full sleeve shirts, half sleeve shirts, t-shirts, pants, shirts, dresses etc. as in FIG. 16.

The system executes an edge detector (such as canny) on the 2D image of the wearable article and key points for shoulders, neck, elbows, wrists, waist, inseam, knee and foot obtained from the pose estimator to determine the corresponding points of interest. Note that the canny edge detector is comprised of the steps: (a) apply gaussian smoothing, (b) find intensity gradients by differentiation, (c) apply non-maximum suppression to eliminate spurious detections, (d) apply double thresholding to determine edges, and (e) track edges by hysteresis, suppressing weak and disconnected edges. In some embodiments, these edge points are determined by a trained NN, or simple algorithms such as horizontal intercepts at boundary edge.

Figure 17:
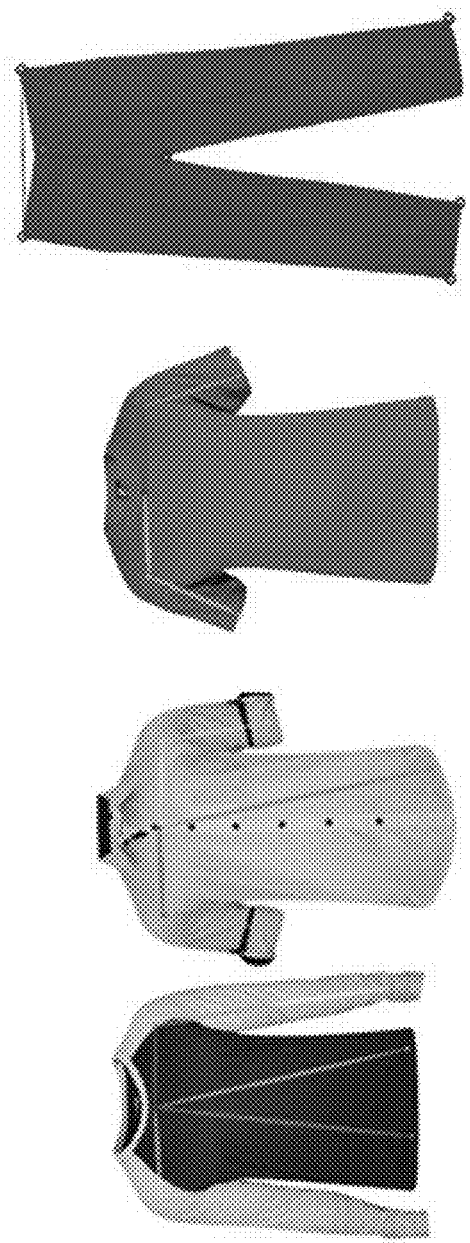
FIG. 17 illustrates 2D images of upper body garments with key points by CNN. These need further training for lower-body clothing (pants), but edge/corner detectors are generally effective as well. This is an example of a feature extraction module.

In some embodiments, the system detects key points as shown in FIG. 17 using feature detection algorithms like the Shi-Tomasi corner detector, SIFT, or SURF. The system further processes features detected by feature detection algorithms to deduce the type (shoulder, elbow, etc) of body part. In some embodiments, the system uses a multistage CNN takes care of this issue by automatically detecting the features and types of body parts; see FIGS. 18-24.

Map Texture from 2D Wearable Article to 2D Image Based on Points of Interest

Let set $P_G$ represent the points of interest on the wearable article and set $P_B$ represent corresponding coplanar points on the body. Let T be the transformation such that T: $P_B \rightarrow P_G$. This transformation can be represented by an essential matrix E, which is a generalized form of homography. The system uses random sample consensus (RANSAC) method to find the essential matrix E if the set of points contain outliers. The system performs the computation represented by the following equation:

$$E * P_{iB} = P_{iG},$$

where $P_{iB}$ and $P_{iG}$ are points inside the polygons (convex or concave) formed by $P_B$ and $P_G$. The pixel values at location $P_G$ are the copied to the location $P_B$. This completes the texture mapping process.

Figure 18:
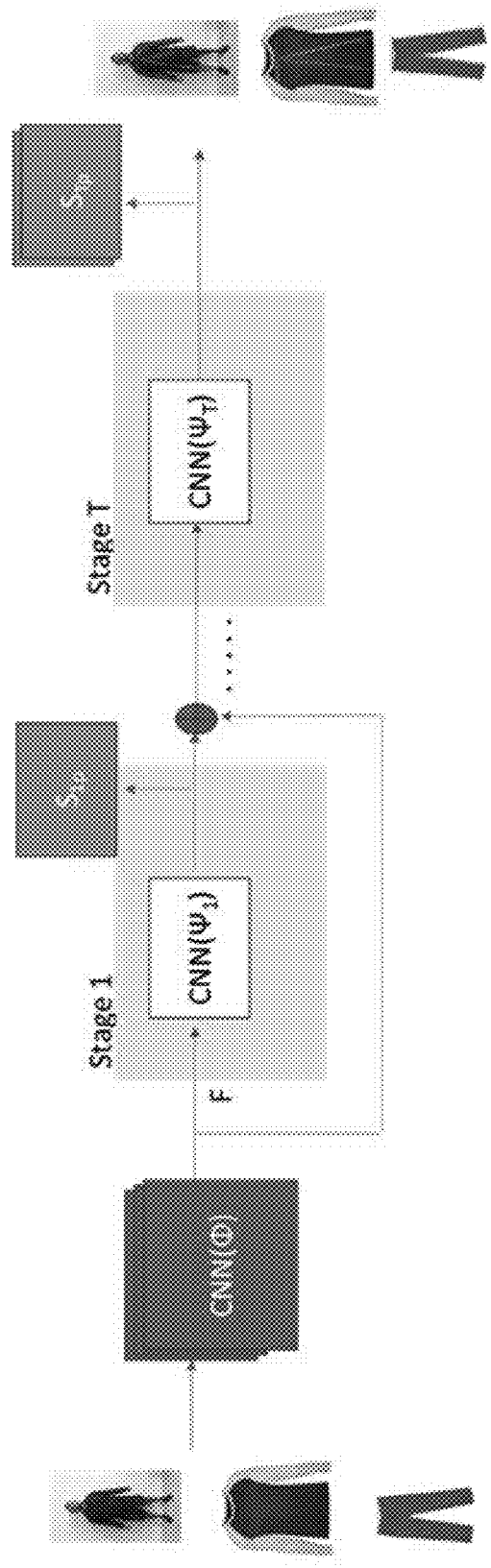
FIG. 18 illustrates key point detection using CNN for 2D imagery. 2D images are the input and outputs are S1p to Stp (confidence maps, which gives the probability of finding key point 'p' in that pixel location). Every key point has its own confidence map.
Figure 19:
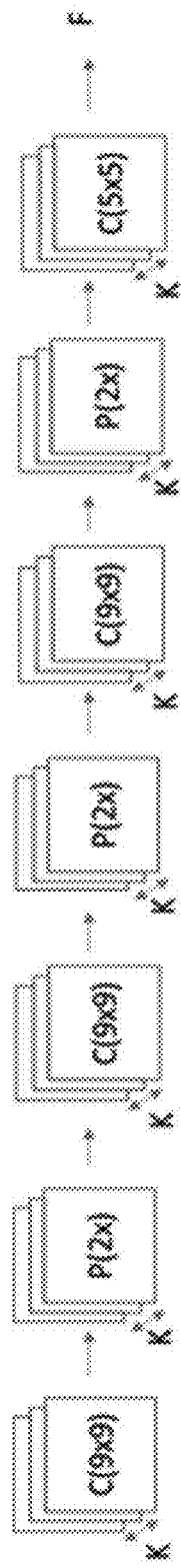
FIG. 19 illustrates CNN(Φ) used for feature vector determination. 'C' represents convolutions and 'P' represents pooling.
Figure 20:
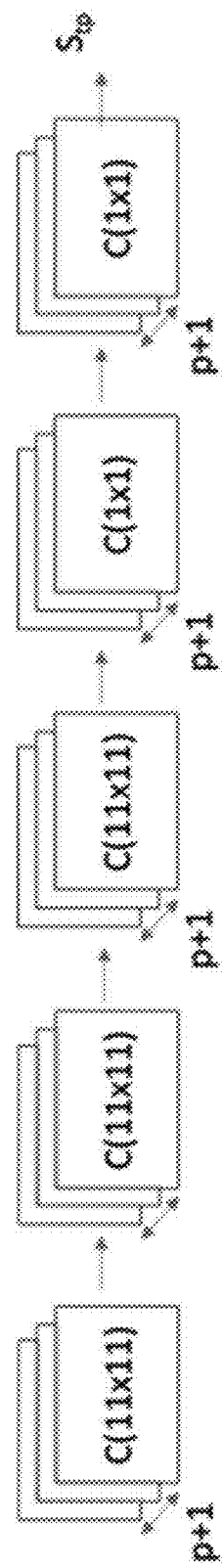
FIG. 20 illustrates CNN(Ψt) used for confidence map 'Stp' determination at stage 't'. The 'p' is the number of key points to be located. 'C' represents convolution. Every key point has its own confidence map.
Figure 25:
FIG. 25 shows a NN-based virtual garment dressing, in 2D.
Figure 26:
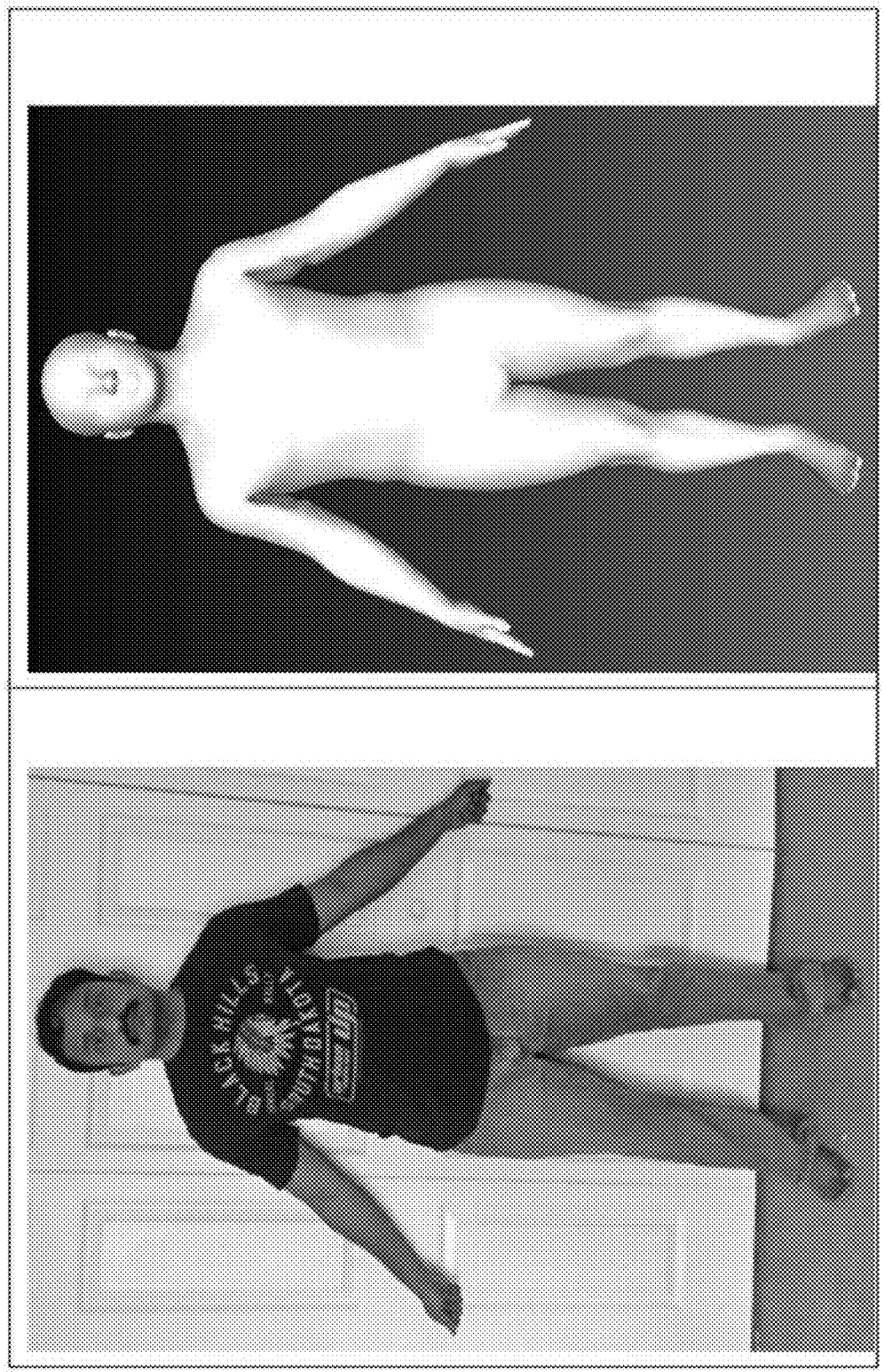
FIG. 26 illustrates deriving 3D models of users, based on a 2D images (plus optional depth) and basic input such as height and weight. Using extensive databases of 3D shape models of the general population, embodiments directly develop generic and flexible body shape models; for example, using just the gender, height and weight of the user (left), the system can obtain a model with nearly matching measurements of chest, waist and hip size—itself a remarkable feat of understanding human bodies. Given images of a user and a garment, by comparing 3D models of each, embodiments of the invention provide automatic analysis of the level of fit, as well as provides synthesized images of the user wearing the garment.

An example of an original image and one mapped with wearable articles are shown in FIG. 25. FIGS. 18-20 show the multistage CNN used for pose estimation and key point detection on wearable articles. The same network structure can be used for training both the pose estimator and wearable article key point detector. In FIG. 18 the CNN Φ (a seven-layer network composed 3×3 convolution layers and pooling between the convolution layers) functions as a feature tensor extractor. The initial layers of VGG-19 can be used for this purpose. The system uses CNN $\Psi_1, \ldots \Psi_T$ (a five layer network composed of three 11×11 convolutions and two final 1×1 convolution) illustrated in FIG. 22 to generate the 2D confidence maps S of part locations and types from feature vector F generated by Φ. After each stage the feature vector is concatenated with the confidence maps to avoid the problem of vanishing gradients. Now:

$S_{t,p} = \Psi(S_{t-1,p}, F)$, where t is the stage and p the part to be located The loss function to minimize during training is to reduce the sum of L2 distances between the predicted confidence and the ground truth confidence maps at each stage. The ground truth confidence maps indicate whether a body or wearable article part is present at that pixel location.

$$L = \min \sum_t \sum_p \|S_{t,p} - S_{G,p}\|_2^2$$

AI-Based 3D Image Processing with Application to Wearable Article

Body Shape Modeling

Figures 21, 22:
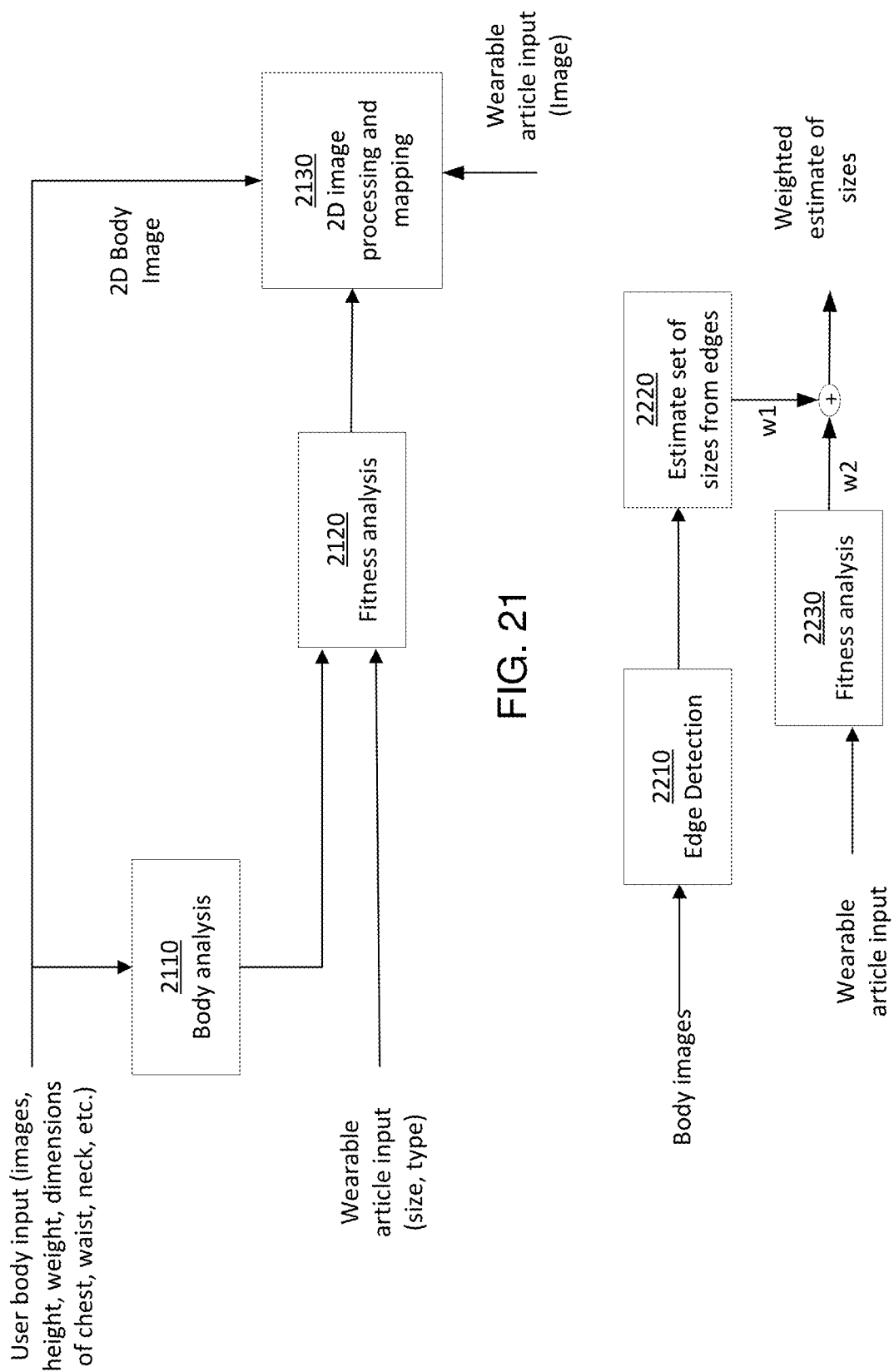
FIG. 21 shows operations performed by a 2D System for draping wearable articles on a body according to an embodiment.
FIG. 22 shows operations performed by a Body Analysis Module according to an embodiment.

FIG. 21 shows operations performed by a 2D System for draping wearable articles on a body according to an embodiment. A body analysis module receives user body input representing information describing a user body including, images of the user, various dimensions of the user such as height, weight, sizes of chest, waist, neck, etc. The body analysis module performs body analysis 2110 using the user body input. The result of the body analysis is provided as input to the fitness analysis module. The fitness analysis module also receives user wearable input, for example, size and type. The fitness analysis module performs fitness analysis 2120 based on the received inputs. 2D image processing and mapping 2120 is performed using various inputs including, the result of the fitness analysis, a 2D body image, and wearable article image.

FIG. 22 shows operations performed by a body analysis module according to an embodiment. The body analysis module receives body images as input and performs edge detection on the body images. The result of the edge detection is used to estimate 2220 a set of sizes from the edges detected. The body analysis module also receives body measurements as input and estimates of sets of sizes of the body from the body measurements. The body analysis module determines a weighted aggregate of the estimates of the sets of sizes obtained from edge detection and estimates of sets of sizes obtained from body measurements to determine a weighted aggregate estimate of sizes of the user's body.

Figure 23:
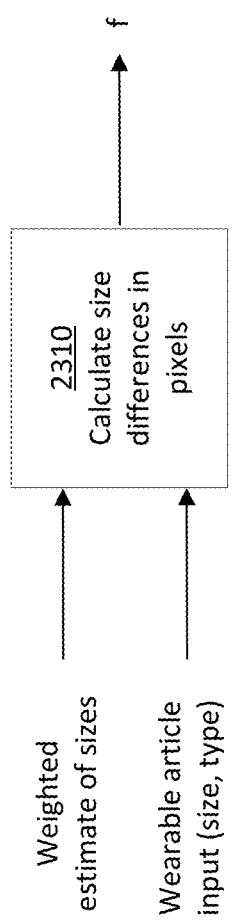
FIG. 23 shows operations performed by a Fitness Analysis Module according to an embodiment.

FIG. 23 shows operations performed by a fitness analysis module according to an embodiment. The fitness analysis module receives weighted estimates of sizes of user's body and wearable article (garment) input (sizes, type etc.) and calculates 2310 size difference in pixels to determine fitness metric f.

Figure 24:
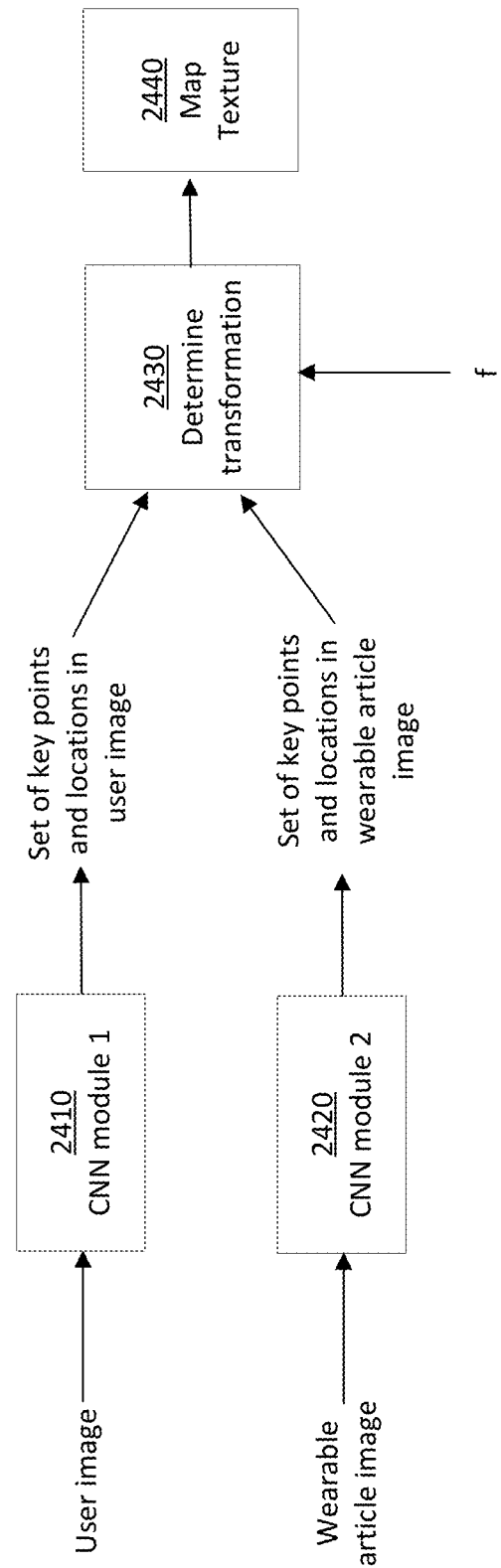
FIG. 24 shows operations performed by a 2D Image Processing and Mapping Module according to an embodiment.

FIG. 24 shows operations performed by a 2D Image Processing and Mapping Module according to an embodiment. The CNN module 2410 receives a user image as input and determines a set S1 of key points and locations on the user's body. The CNN module 2420 receives a wearable article image and determines a set S2 of key points and locations on the wearable article. The set of key points and locations on the user's body and the set of key points and locations on the wearable article and fitness metric f are used to determine 2430 a transformation from S1 to S2. The determined transformation is used to map 2440 texture from wearable article to user body image.

The system uses a generic and flexible model of an adult human (American, for example), with separate models for males and females. This is based on extensive databases of adult human body shapes, and applying deep learning techniques. Then, a specific user is requested to provide an input full body image (or preferably images, including front, side, and back), along with some basic parameters such as gender, height and weight, and with additional parameters such as neck, chest, waist, and hip measurements as optional inputs. This data is further supplemented in-app by observing and measuring (learning) specific user parameters, using both RGB sensors as well as any depth sensors, again using deep learning techniques. This learning improves with continued use, by refining model parameters and collecting a library of user feature textures such as facial features. This technology leverages the existing corpus of academic and other research in body shape analysis and categorization for developing the flexible generic model. The disclosed framework combines learned generic models, with live user input data for user-tailored models and image features.

Figure 27:
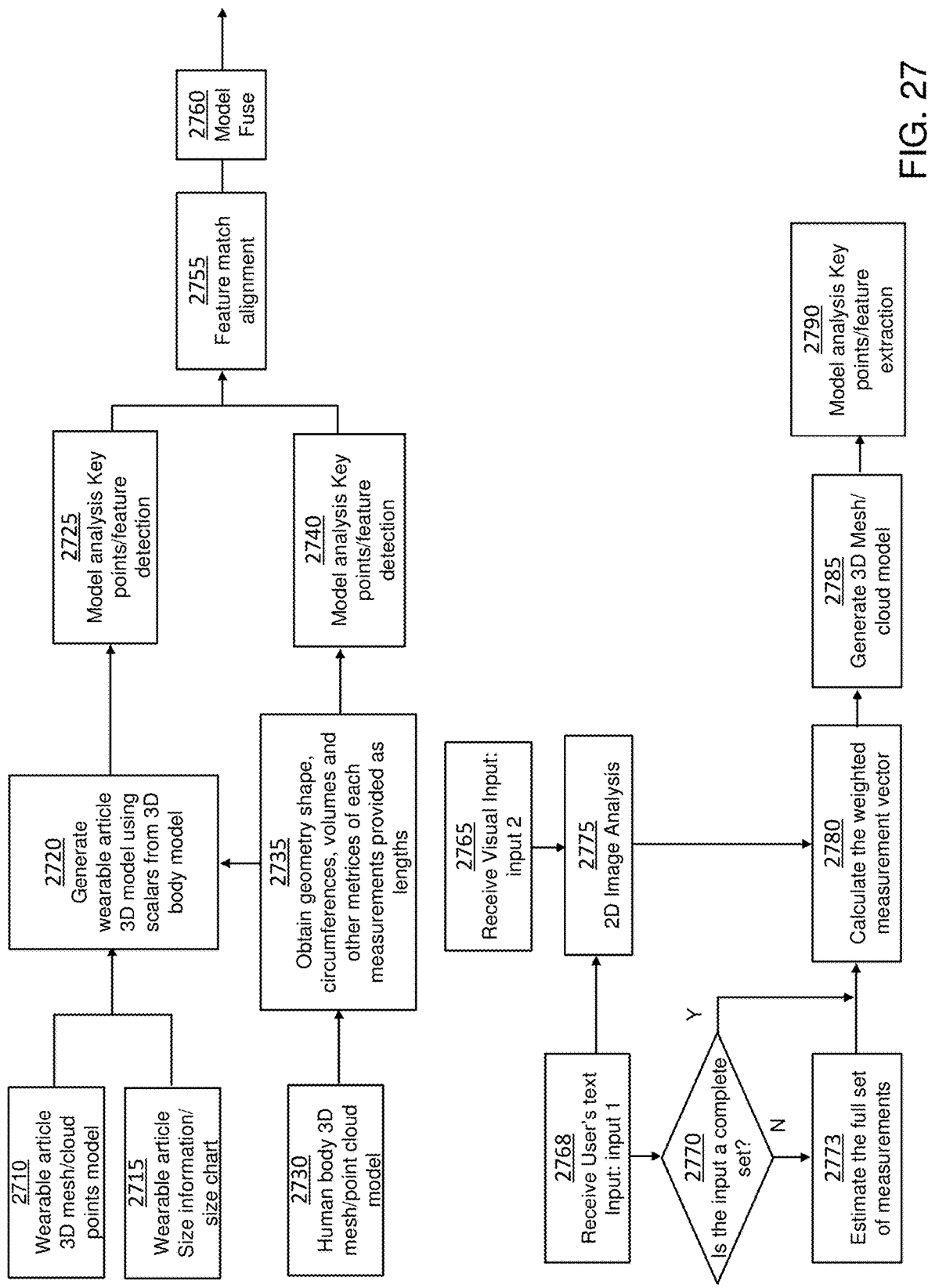
FIG. 27 provides details of 3D processing, given input imagery and parameters.

FIG. 27 provides details of 3D processing, given input imagery and parameters according to an embodiment. The system also receives human (user) body 3D mesh/point cloud model 2730 and obtains 2735 geometry shape, circumference, volumes and other metrices of each measurements (provided as length). The system receives a representation 2710 of wearable article as 3D mesh or point cloud and wearable article size information/size chart 2715 and processes it along with the user body information 2735 to generate 2720 a wearable article 3D model using scalars from the 3D user body model. The system performs model analysis 2725 of the wearable article 3D model 2720 to detect key points and features. The system also performs model analysis 2740 of the use body 3D model 2735 to detect key points and features of the user body. The system performs feature match alignment 2755 and performs module fuse 2760 to generate the unified superimposed model.

The system receives 2768 user's text input and also receives 2765 visual input and performs 2D image analysis 2775. The system verifies 2770 if the received text input is a complete set. If the system determines that the received user input is not a complete set, the system estimates 2773 the parameters that were not specified to determine a full set of measurements. The system calculates the weighted measurement vector based on the full set of measurements and the result of the 2D image analysis. The system generates 2785 3D model based on either a mesh or point cloud representation. The system uses the generated model for model analysis 2790 to detect key points/features.

Generating a Body Model

The system limits the inputs required from the user. Let M_in be the input measurements, then a generic model M_gen needs to be estimated based on M_in. Body parts are typically assumed to be proportional and have high correlation between them (not always, but typical). The system learns parameters describing such correlations from vast data store of samples in the body shape database. The system estimates M_gen from M_in. The system uses images and videos to estimate the measurements. In this method, the system uses height as a reference to scale other estimated measurements in terms of height. This method is useful when other information is uncertain. Based on the reliability, the system performs weighted combination of measurements obtained from two different sources using the credibility coefficients of each measurement.

First, the system represents 3D shapes using point clouds and meshes. Without using any imagery of a particular user but only some measurements, the system generates fairly accurate models for 3D objects using some elementary statistics (and a database of body shapes). With additional measurements or imagery, the model improves. For a particular user, various body measurements are used to generate a suitable 3D body mesh model. Example measurements incorporated in the model include: height, weight, chest, waist, hip, inseam, neck, length of arm, shoulder. Other measurements could also be used in this task. Knowing these measurements allows the system, via trained machine learning models using the database, to predict the others using the trained machine learning models. The system may not attempt to estimate the characteristics of the face, as that can be difficult. However, a representation of a face is not needed for the most part by the system. The face is regarded as just another texture that is added to the final model. In embodiments where the system has access to depth sensing, the system creates a 3D model of user directly, including the user face.

For a given user, the system receives a user gender, and determines set m to be a vector of suitable body measurements (or set m(1)=gender).

$$m=[m(1);m(2);m(3); \ldots ;m(K)],$$

where, m(i) is a useful body measurement. For example: height,weight

Given a database of body shapes, the system applies statistics to it. Effectively, the system works with a mean model for the database, and then scales parameters up or down according to the statistics. So let Mesh_mean be a mesh representing a mean shape model. The system performs following steps: (1) The system obtains a set of measurements and scanned meshes of different gender and body shapes. (2) The system generates a mesh corresponding to body shape with mean measurements. (a) Mesh_mean is denoted as $Mesh_{mean}$ (b) Mean measurement is denoted as $\mu_m$. (3) The system generates a series of offset meshes corresponding to increasing $\Delta$ units for each measurement i. For example, supposed the $i^{th}$ measurement is height. If the unit used for height is mm, and the known mean value of height is mean(i), then a mesh corresponding to mean(i)+$\Delta$ in height is generated from the scanned mesh database. The corresponding mesh is recorded as $mesh_{offset}$ (i). (4) The system generates a mesh with measurement m as follows: (a) Calculate scalar factor: $s=(m-\mu_m)/\Delta$; (b) Determine scalar for mean mesh: $S_{mean}=1-\Sigma_{i=1}^{K}s(i)$. Generate mesh:

$$Mesh\_generated=S_{mean}*Mesh_{mean}+\Sigma_{i=1}^{K}s(i)*mesh_{offset}(i).$$

(5) Calculate dependent body measurements based on fixed measurement as follows. In order to generate a proper body model, the system needs to know all the measurements mentioned above. In case only partial information is available, the system can estimate other missing measurements from the covariance matrix of all the measurements. Let the nx1 vector X be a set of known or acquired measurements and let the mx1 vector Y be a set of unknown, thus dependent measurements (n+m=K); for example, the system can just have n=2, with height and weight. Then the joint variance $\Sigma_{X,Y}$ can be represented as:

$$\Sigma_{X,Y} \begin{bmatrix} \Sigma_X & \Sigma_{XY} \\ \Sigma_{YX} & \Sigma_Y \end{bmatrix},$$

Where, $\Sigma_X$=cov(X), $\Sigma_Y$=cov(Y), $\Sigma_{XY}=\Sigma_{YX}^T$=cov(X,Y).

Let $\mu_X$=E(X), $\mu_Y$=E(Y), the system calculates an estimation of Y as:

$$\tilde{Y}=\mu_Y+\Sigma_{XY}^T\Sigma_X^{-1}(X-\mu_X).$$

Body Proportion and Feature Points from Meshes

Figure 28:
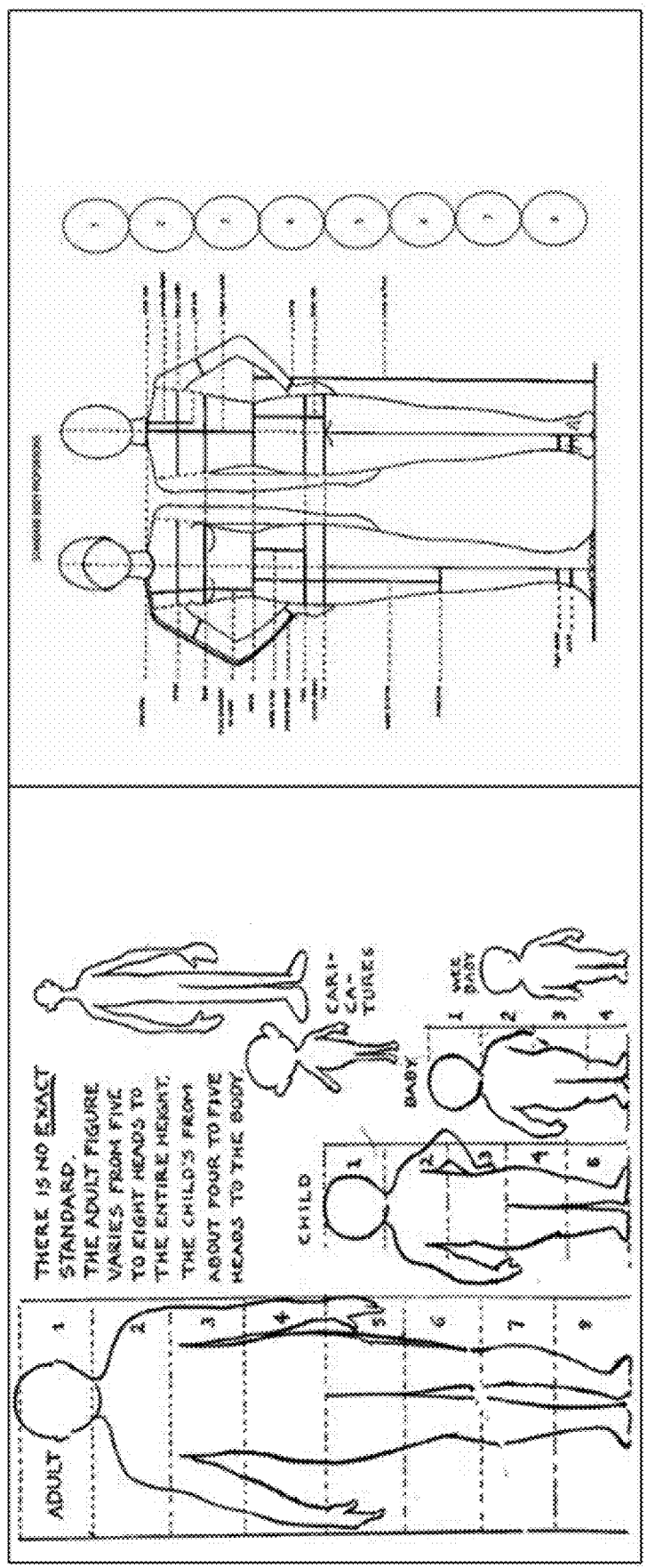
FIG. 28 shows an example of body measurements, and proportions, for adults, children, and women.
Figure 29:
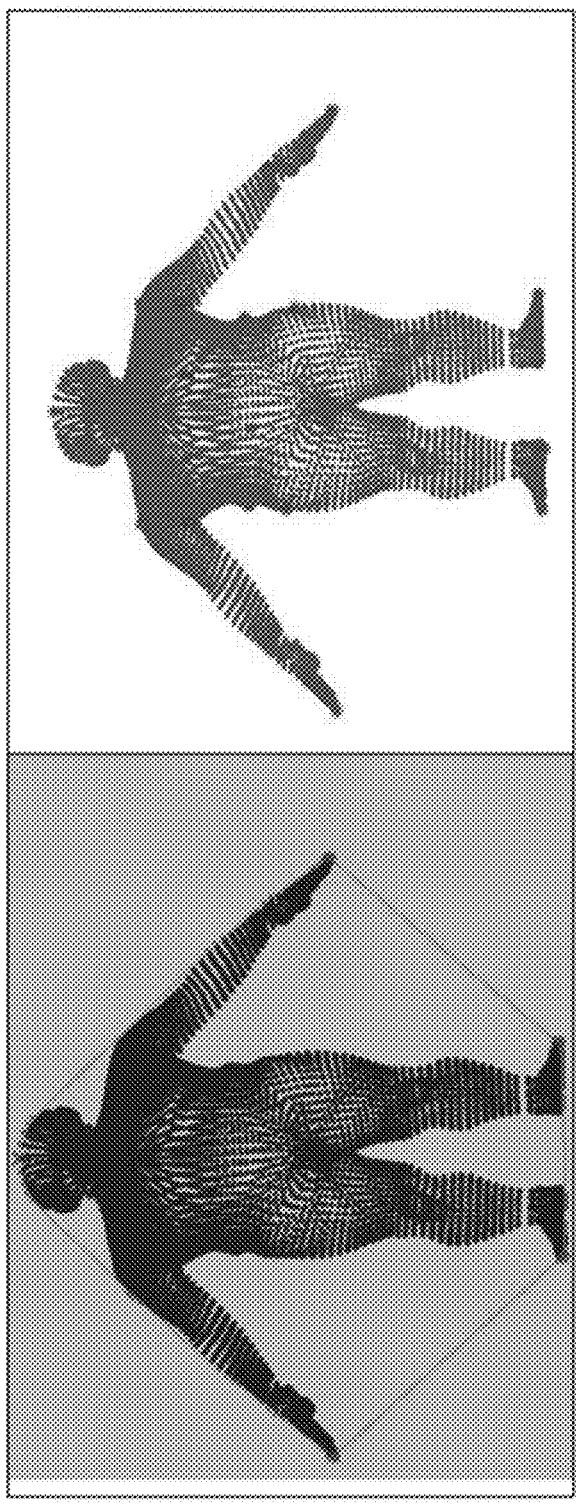
FIG. 29 illustrates body convex hull, (a) a modern variant of da Vinci's "Vetruvian Man"; (b) with feature points marked in red.
Figure 30:
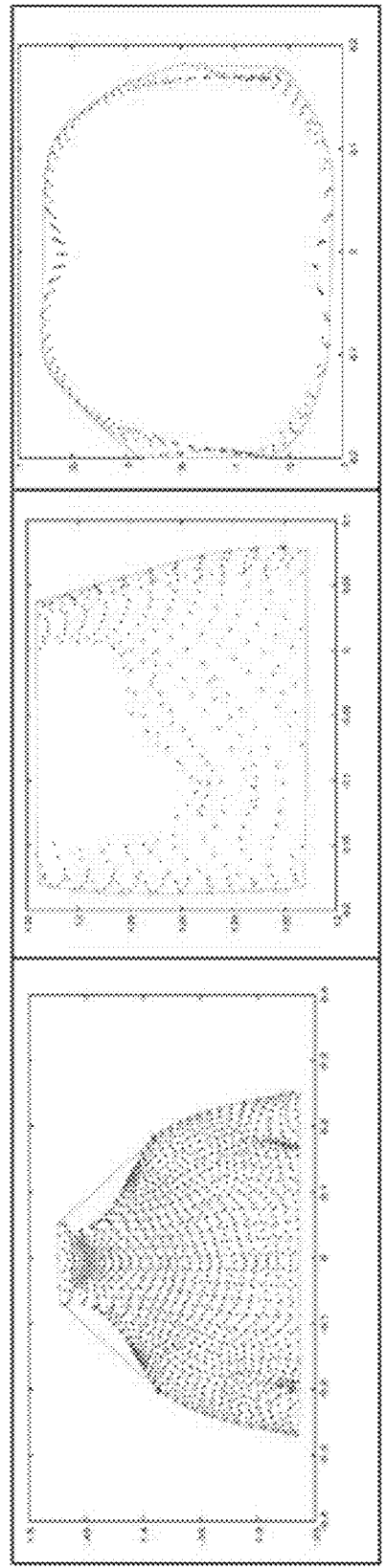
FIG. 30 shows points in sections of the body, with convex hulls, and extrema point (e.g., nipple) detection. Besides circumferences, additional measurements can be made.
Figure 31:
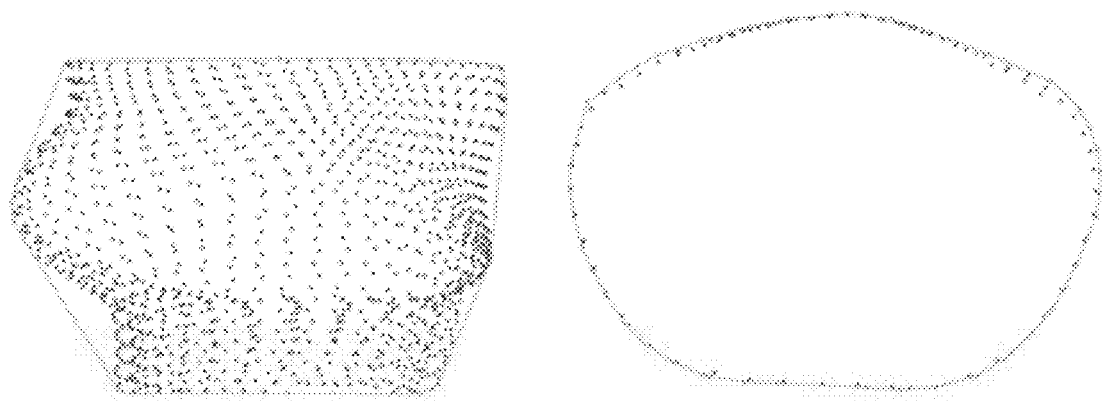
FIG. 31. Left: convex hull of hip. Right: hip circumference.
Figure 32:
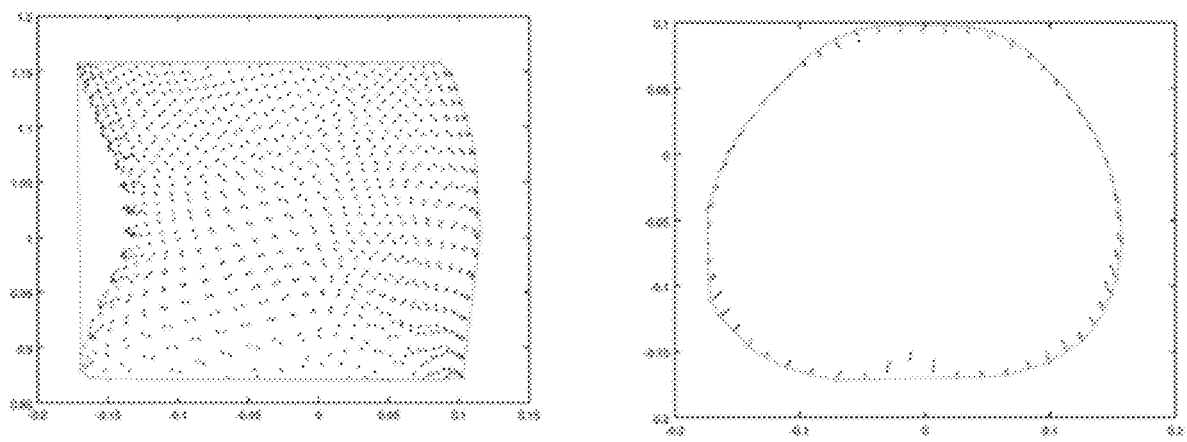
FIG. 32. Left: waist convex hull; Right: waist circumference. Similarly, from the waist convex hull, the system determines: vert_waist_left=B(idx_waist_left) and vert_waist_left=B(idx_waist_left), and the hip circumference.

Although each person has unique body proportions, there are still similarities among them. FIG. 28 is an example of ideal male body with the height equals to 8 head lengths. This can be a guideline to segment point cloud models.

Following the convention in FIG. 28, the system divides the whole body into 8 equal-length slices. The different body segments are referred as $$B = S1 \cup S2 \cup S3 \cup S4 \cup S5 \cup S6 \cup S7 \cup S8$$

Where $B = \left\{(x, y, z): \text{set of } 3d \text{ vectors of all} \frac{\text{points}}{\text{vertices}} \text{in a body mesh}\right\}$.

Cloth Measurements

FIGS. 29-32 show measurements that may be used for wearable article fitting. In order to fit a wearable article to a 3d body model, the system learns the key points from the 3d body mesh.

Body Convex Hull

Under the constrained scan, every body holds the same position as shown in FIGS. 29-32. The system extracts the following points from the convex hull: left-toe, right-toe, left-finger-point, right-finger-point and top. The system further extracts from the convex hull of S7, the points representing shoulders and denotes them as 3D vectors: vert_shoulder_left and vert_shoulder_right. Their index are idx_shoulder_left and idx_shoulder_right respectively:

vert_shouder_left=$B$(idx_shoulder_left)

vert_shouder_right=$B$(idx_shoulder_right)

Chest

From the chest convex hull, the system first determines locations of two nipples: vert_nipple_left=B(idx_nipple_left) and vert_nipple_right=B(idx_nipple_right), then determines out the chest circumference.

Similarly, from the hip convex hull, the system determines locations of left and right end points of the hip: vert_hip_left=B(idx_hip_left) and vert_hip_right=B(idx_hip_right), and the hip circumference.

Similarity, from the waist convex hull, the system determines points representing locations of left and right end points of the waist: vert_waist_left=B(idx_waist_left) and vert_waist_right=B (idx_waist_right), and the hip circumference.

As a specific example, the system uses a generic parametric model to statistically predict the full body shape model, just given the gender, height, and weight of a user. In particular, this model can predict other parameters such as neck, chest, waist, and hip size. If any such measurement parameters are also available as input, they are used to refine the model for improved accuracy. Finally, imagery of the user is used to independently estimate user parameters as needed, and again used to refine and tailor the model to the user. Finally, textures of the user from the input image(s) are used to finalize the user model.

Wearable Article Model

The system uses a more limited model for representing a wearable article (such as a shirt, pant, or dress). The system refines the model with data of specific wearable articles including their images. For example, the system labels a 3D model of a shirt by its neck size, and general size (e.g., large). The system may additionally annotate the 3D model of the shirt using a label representing the type of fit, e.g., loose, slim or sometimes "European". Similar qualitative terms are used in the descriptive labeling of pants, dresses, suits, and many other wearable articles. Embodiments of the invention make these more precise both in modeling, and wearable article labeling.

Merging Body and Wearable Article 3D Models

The system merges a 3D body and wearable article to generate a unified superimposed 3D model by performing the following steps: a) identifying feature descriptors that capture the geometric structure at key regions in the model (for a 3D body model it could be shoulder joint, elbow, neck, waist, inseam, knees etc. . . . for a 3D wearable article model, like a pant, it could be the waist, inseam, knees, etc.) b) matching the feature descriptors from both the models depending on the geometric structure encoded by the features c) merging the 3D models with the matched feature descriptors as guide to orienting the models appropriately.

The following are methods according to various embodiments to achieve this goal:

(a) 2D View Based Feature Generation, Mapping and Merging:

A 3D model can be represented as a set of 2D views. Thus, after normalizing and orienting the models to the same perspective view in Euclidean space, a set of 2D projections of the models are taken in predetermined planes in that space. Then the method described in the section '2D image processing of user and wearable article' can be used to generate texture mapped views for each element in the set. Finally, the merged 3D model is constructed back from the set of 2D texture mapped views. Surface reconstruction of the 3D models must be done before using this method and it will not work on raw point clouds.

Figure 40:
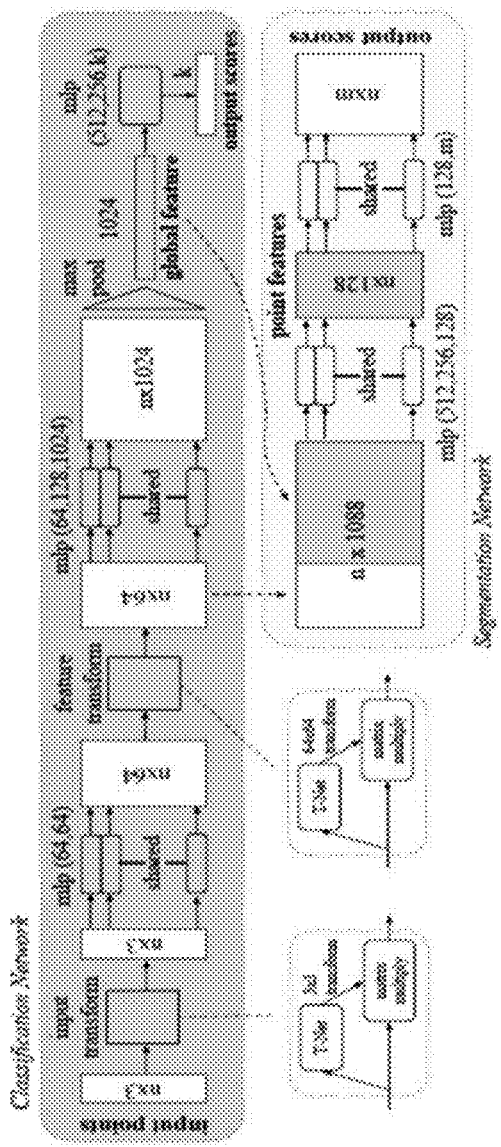
FIG. 40 shows an example (PointNet) deep NN. The input is point cloud of size n. mlp stands for multilayer perceptron. T-net is an alignment/transformation network (like an affine transformation matrix) for input and features.

(b) 3D CNN Based Feature Generation, Mapping and Merging:

This CNN network, known as PointNet (FIG. 40), works directly on point cloud data of the 3D models. For a point cloud of size n the CNN outputs nxm scores for each of the n points, where m is the body or wearable article part type. In this method each point in the cloud is treated individually without using the geometric relation between nearby points. Feature descriptors for 3D models are then extracted from combing scores from neighboring points. The feature descriptors obtained from the body and wearable article models are then matched (depending on the type), oriented and merged.

Figure 41:
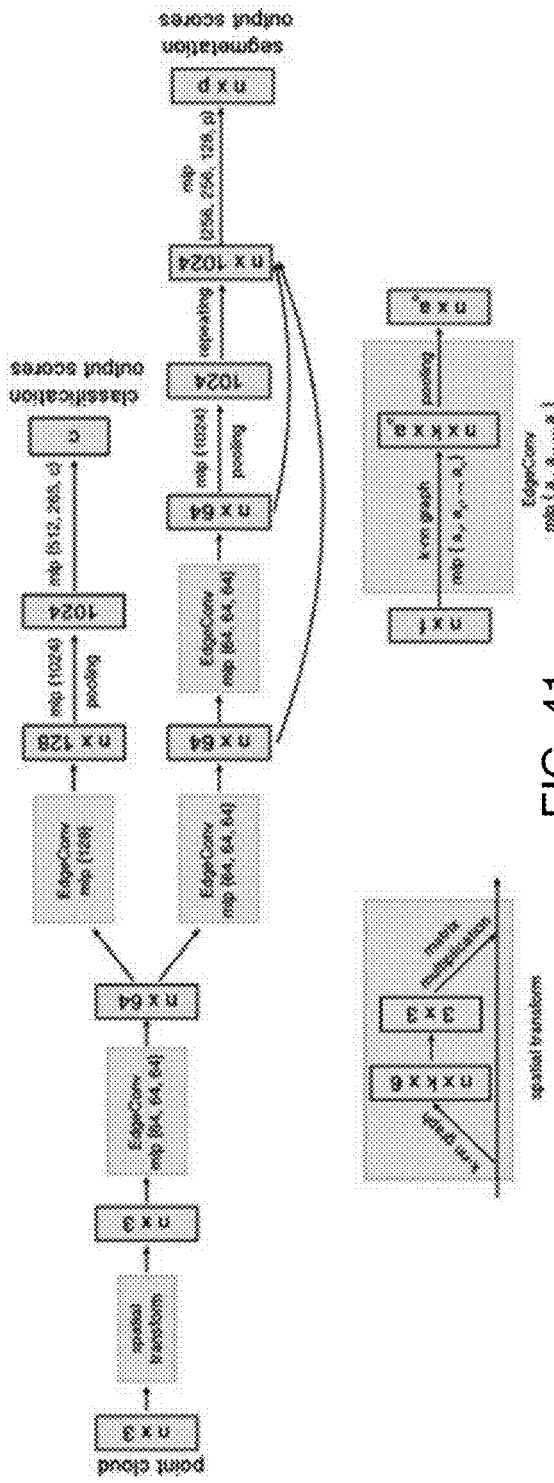
FIG. 41. Dynamic graph 3D CNN; The input is point cloud of size n. MLP stands for multilayer perceptron. Spatial transform block aligns point cloud to a canonical space by applying an affine/transformation matrix. Edge-Conv takes as input a tensor of size nxf; computes edge features for each point using mlp with layer size (a1, a2 . . . an); generates a tensor of shape nxan after pooling.

(c) Dynamic Graph 3D CNN Based Feature Generation, Mapping and Merging:

Dynamic graph 3D CNN's (FIG. 41), can be used to generate feature descriptors by exploiting local geometric structures. Instead of working on individual points in the point cloud like PointNet, these work by constructing a local neighborhood graph and applying convolution on the edges connecting neighboring pairs of points. The graph is dynamically updated after each layer in the network. The feature descriptors obtained from the body and wearable article models are then matched (depending on the type), oriented and merged.

AI-Based Virtual Dressing Visualization App Outline

The models of the user body and the wearable article are combined to produce a joint 3D model, via model merging techniques, which in turn provides the basis for creating both wearable article fitness quality models, as well as visuals (e.g., images) of the user wearing the wearable article, in a mobile app. The system develops and deploy a low-cost, portable, and easy-to-use consumer sensor system with voice activation, incorporating visible light and optionally infrared depth sensors. Examples are the cameras on smartphones and tablets, potentially enhanced with depth. Various embodiments of the system use at least one and up to 3 sensor systems, capture video images (in visible and optionally infrared depth), or using a single sensor system, acquire video imagery of the user doing a 360-degree turn, to provide additional sensor data.

Using at least one full frontal image of a user, the system develops a 3D model of the user using advanced signal processing and neural networks, as follows. If a depth sensor is available, develop a point cloud (PC) representation of the user, and use the visible light data to enhance and refine the point cloud representation. If no depth sensor is available, use 2D imagery of the user, and trained models from databases, to develop a 3D model (again, a PC) of the user. Communicate imagery/PC to server.

At all times, the system protects the privacy of the user. The user data is private to the user, while aggregate (unmarked) PC data is available for enhancing databases and refining models.

Since neither the visible light nor the depth sensors is fabric penetrating, the image capture of the user requires wearing minimal or body-fitting wearable article (such as spandex materials). However, in some instances where the outfit is designed to actually reshape the body (e.g., strong belts, tight pants, sports bras, etc.), suitable corresponding materials should be worn at capture to more accurately reflect the 3D body profile to target.

Using 3D scanning technology based on such sensor data (depth and/or model-based), develop an accurate, affordable, private, and instant (e.g, in seconds) 3D model of a user body. That model is developed in one of several possible modes: (a) In a client-server architecture, where the point cloud data is sent to the server for modelling. (b) In a local client-server architecture, where the server is a software or embedded product residing in a local device owned and operated by the user. (c) In a self-contained application running on-chip locally in the sensor system platform.

The final scanned model is catalogued at the central server, and user app. Through extensive databases, and subject capture of point cloud models and deep learning techniques, develop/refine a coding scheme of general 3D body type codes, to create a set of discrete 3D body size codes. These serve both as wearable article labels, as well as to characterize the body shape of a user (e.g., shirt size of "3GF29", etc.). Body shape classification is done using clustering methods such as vector quantization, support vector machines, neural networks, and other deep learning techniques. The system applies similar processing to wearable articles; compares body shape to wearable article shape in 3D, to develop a variety of fitness quality metrics; develops a trained algorithmic or neural network based aggregate metric for the fitness quality of the wearable article on the user; develops and provides user with imagery of the user wearing the wearable article (virtual dressing), using deep learning methods as disclosed, along with the fitness quality metric.

Details of AI-Based Virtual Dressing Room Method

For the purposes of body and wearable article size categorization, the system may determine only a moderately accurate level-set model of a person (or wearable article), and certain simplifications can be made. (1.) Select N horizontal contours to represent the user body, and wearable article (e.g, N=25-100). (2.) Start with the circumferences of the contours, body and wearable article, add other measures (between slice surface areas, volumes) as needed for added accuracy. (3.) This reduces to two points (user, wearable article) in a N-dimensional Euclidean space, $R^N$. (4.) The aggregate model points for all individuals in a population creates a scattering of points in this N-dimensional space. Classify the model points into M categories, M=25-100. (5.) Apply techniques of clustering, and deep learning to create classes of body shapes. (6.) From a population of millions, the system classifies their body shapes into M categories (e.g., M=100), and similarly for wearable articles, which typically cover a portion of the body shape. The fewer the categories of wearable articles, the easier their mass production, but the less precise the fit. So there is a tradeoff between industrial production needs and consumer satisfaction needs. This same tradeoff exists today. The system develops about M=100 categories of the 3D human body models, and about M=25-50 initial categories for each type of wearable article (e.g., shirt, pant, dress), represented as portions of 3D human body models. (7.) Note that the measurement and categorization system is developed over time by the household penetration rates of sensor systems, and the data collection by central servers, which aggregate 3D models of populations, starting with existing databases. (8.) These limited set of categories are finalized are given succinct codes, which translate to labels of body types as well as clothes. These are distinct for men, women, and children. (9.) Labels for clothes then conform to these body types. Note that body type codes refer the whole body, whereas clothes are labeled according to the portion of the body covered. The 3D models for each provide quantitative measures of fitness quality, superior to existing labels. This method provides assured confidence in buying merchandise online as to the fit.

Figures 12A, 12B:
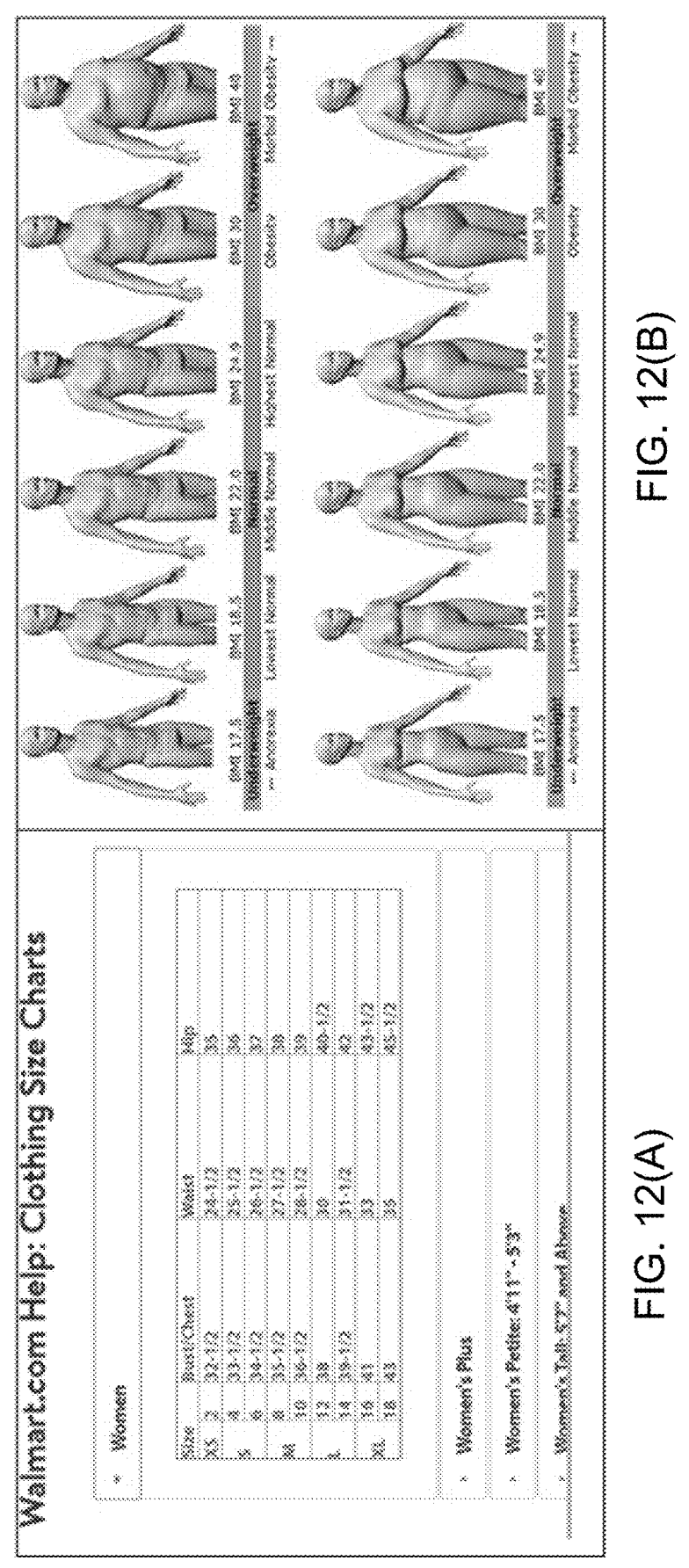
Figures 14A, 14B:
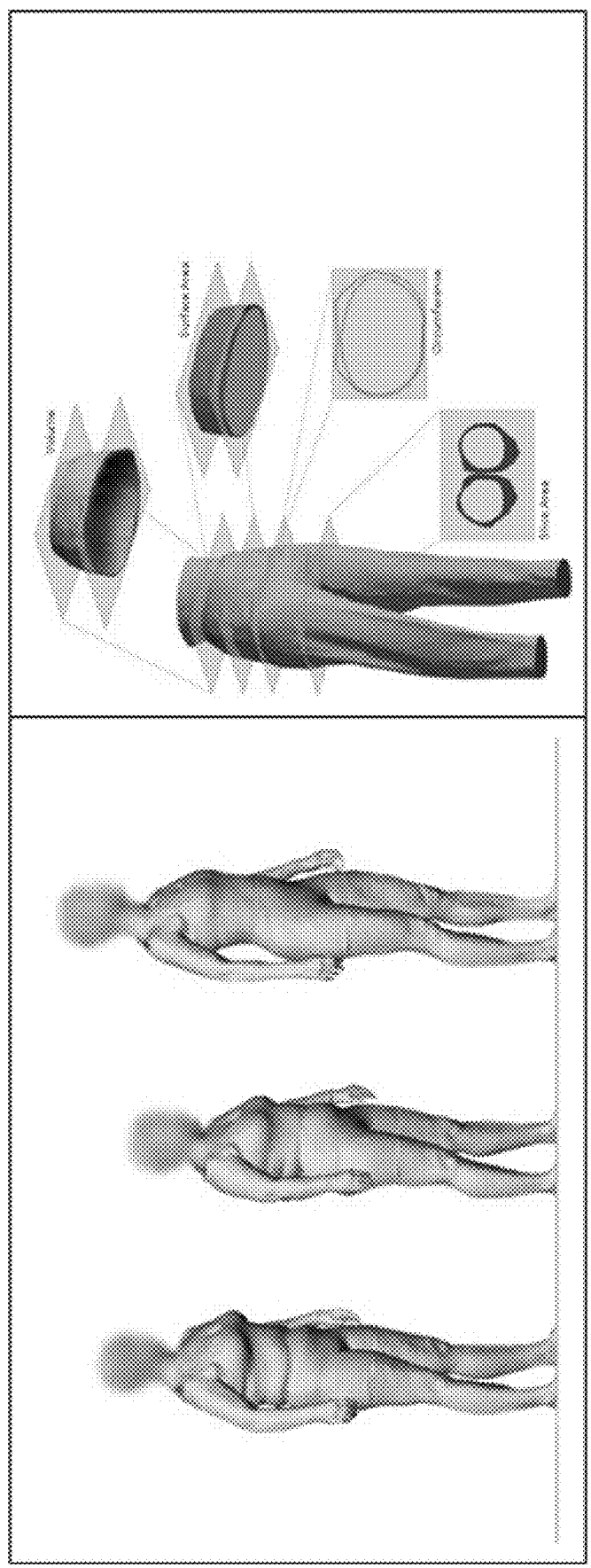
FIG. 14 (A) illustrates that three different body types of women would all wear the same size 10, which is clearly inadequate.
Figure 33:
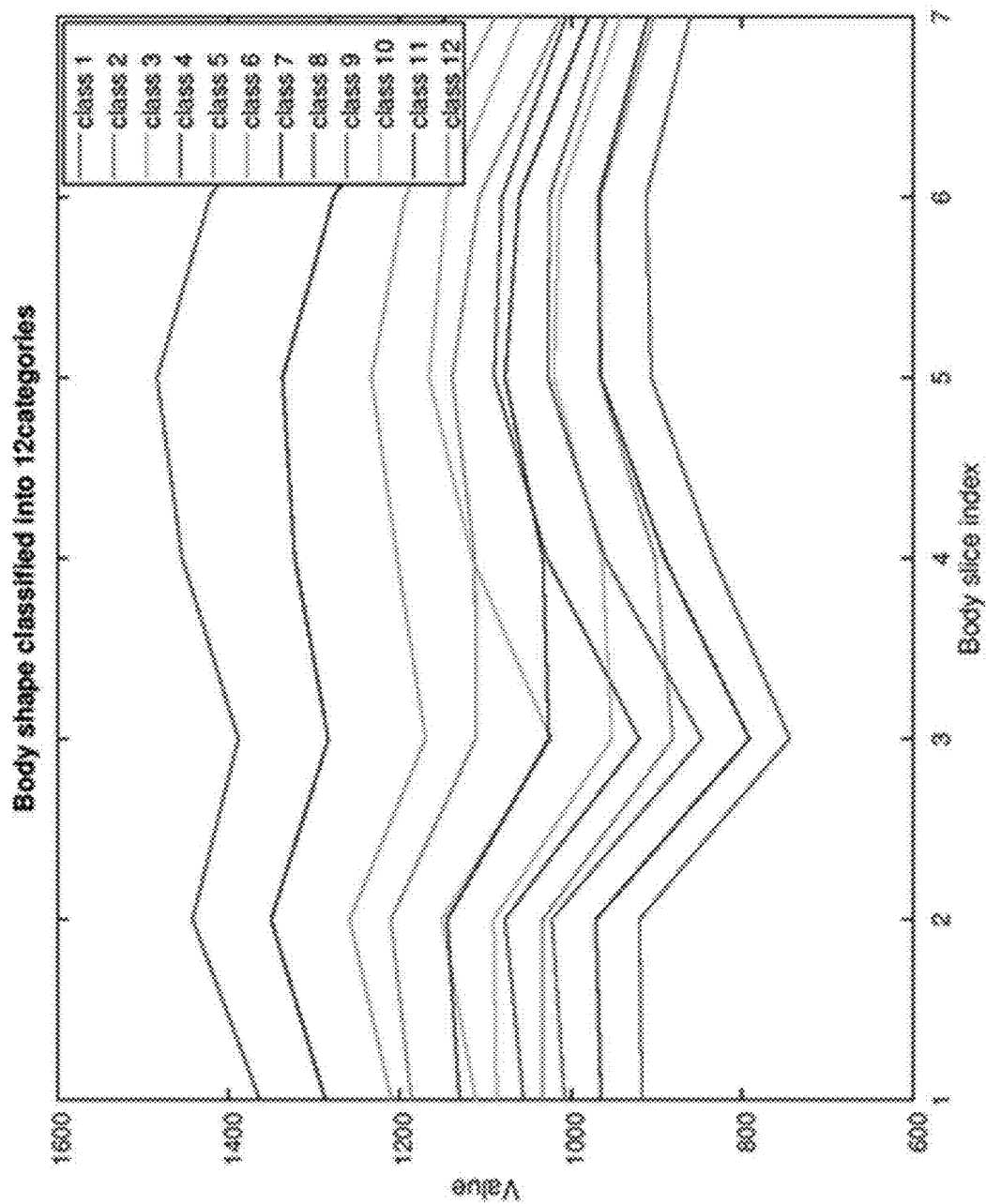
FIG. 33 shows a database of height-normalized models clustered into 12 classes, and measured at 7 slices at the cluster cells, whose circumferences were measured. This visualizes the variation of body times (note again that height has been normalized).
Figure 34B:
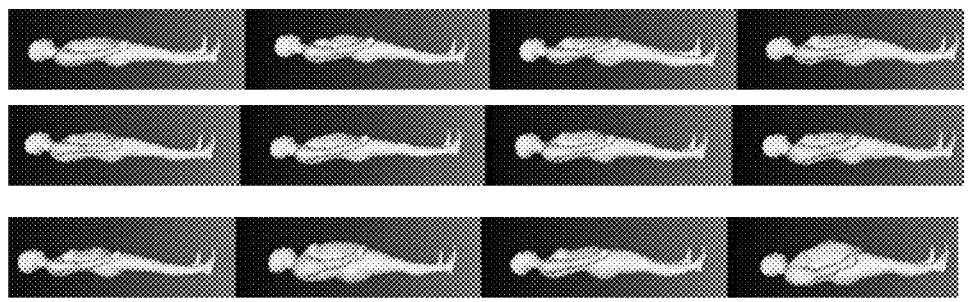
FIG. 34(B) shows the side views.
Figure 34A:
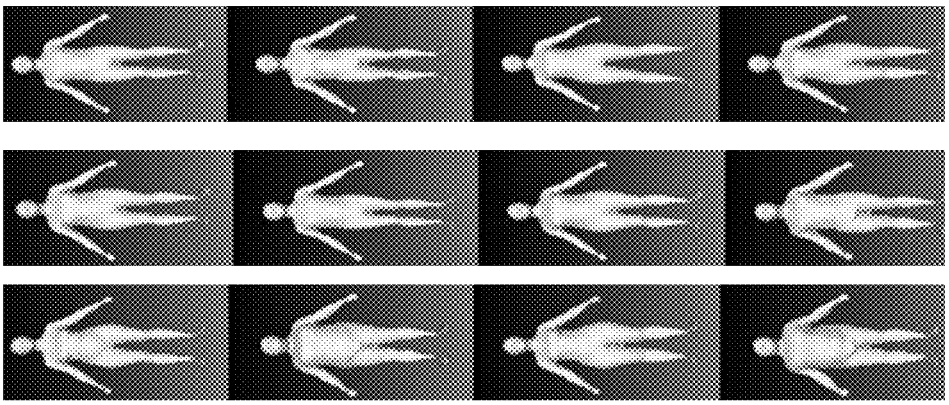
FIG. 34(A) shows the front views.
Figure 35:
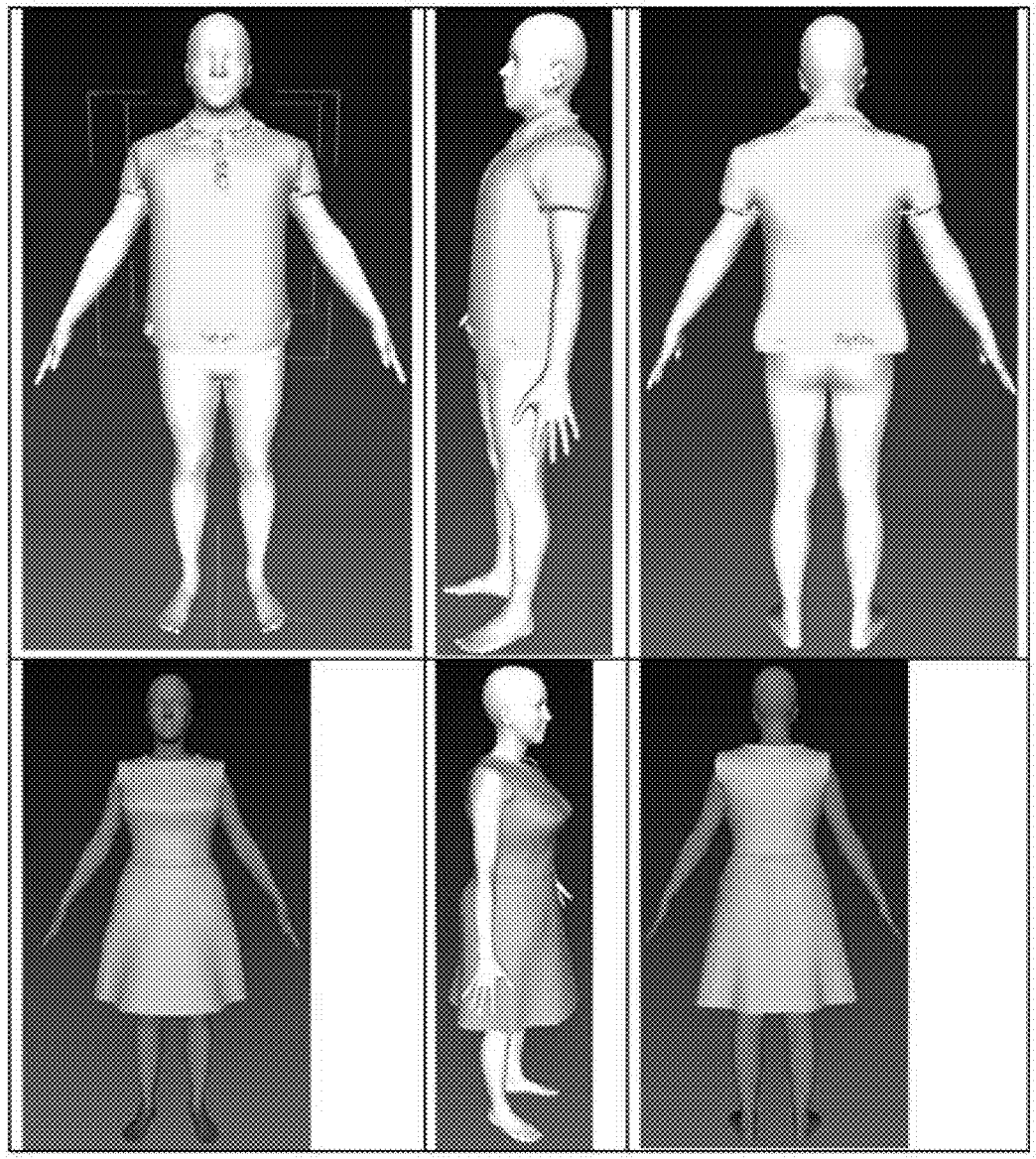
FIG. 35 shows a combined body and garment model according to an embodiment, illustrating an example of shirt, for male (shirt), and female (dress).

FIGS. 12-14 indicate the method of taking measurements of body models (slice circumferences, as well as area, volume). Just for illustrative purposes, FIGS. 33-34 show examples of using 7 slices of the model bodies, and developing 12 body cluster classes. Note that in FIG. 33, the cluster types do not have uniformly graded sizes at all slice levels. That is, while the entire population may have generally Gaussian densities, their useful segmentation into classes need not be so cleanly distributed, a finding of our research.

Augmented Reality Applications

In this section, the use of this invention in augmented reality is described. Here, in addition to the above, embodiments make use of methods described in U.S. patent application No. 62/384,532, "Method and System for a Fully Immersive Virtual Reality," which is incorporated by reference in its entirety. In terms of applications in communications, we refer to U.S. RE44743, "Digital Composition Coded Multisensory Messages," which is fully incorporated by reference herein.

(1.) A point cloud (PC) model for each frame of a video of a user is generated using the sensor system, and using available local and central server resources. (2.) The PC is converted into a mesh representation of the video. (3.) The mesh is painted with captured and tiled texture from the RGB cameras. (4.) The ensemble of mesh+tiled texture video is then packaged and made available for incorporation into other contexts (video games, movies, other image/video material, etc.), and multimedia communications. These applications can use a mix of captured and stored data (and online server resources) for composition and communication, per RE44743.

Figure 36A:
FIG. 36(A). AMAZON's 2nd gen Echo Look (2017), a digital "style assistant" that can advise on fashion. It takes pictures, short videos, stores them in the cloud, and works with Alexa to provide a host of information, from weather, traffic, etc.
Figure 36B:
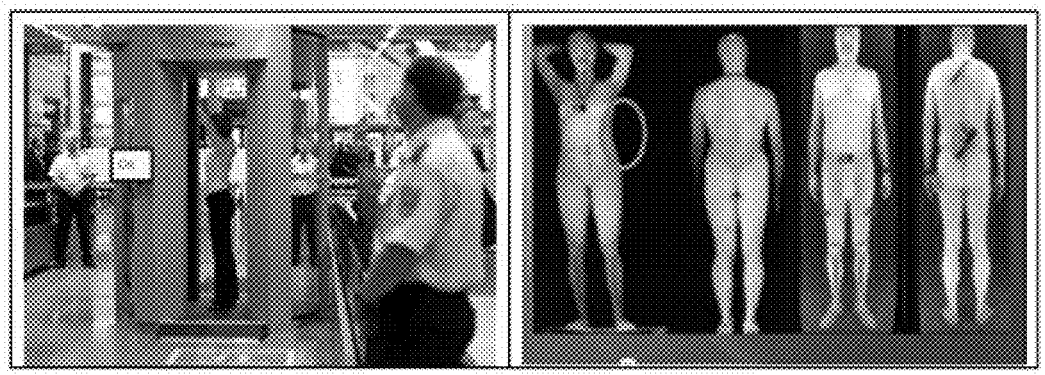
FIG. 36(B). L3 ProVision Scanner used at airports. Typical body scans as produced by the L3 Provision scanner. The purpose in this application is detection of potentially dangerous weapons (such as on the right). 36(C) Some commercial body scanners for general use. Note the similarities to the airport body scanners. (left) the mPort mPod; (right) The SizeStream SS20 3D Scanner, March, 2017 Model. But both of these scanning systems are still bulky booths which are cumbersome.
Figure 36C:
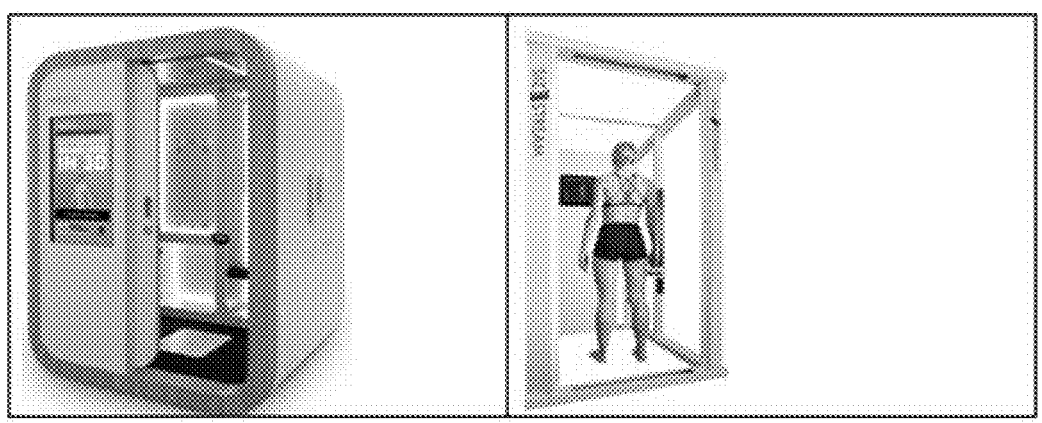
Figure 37:
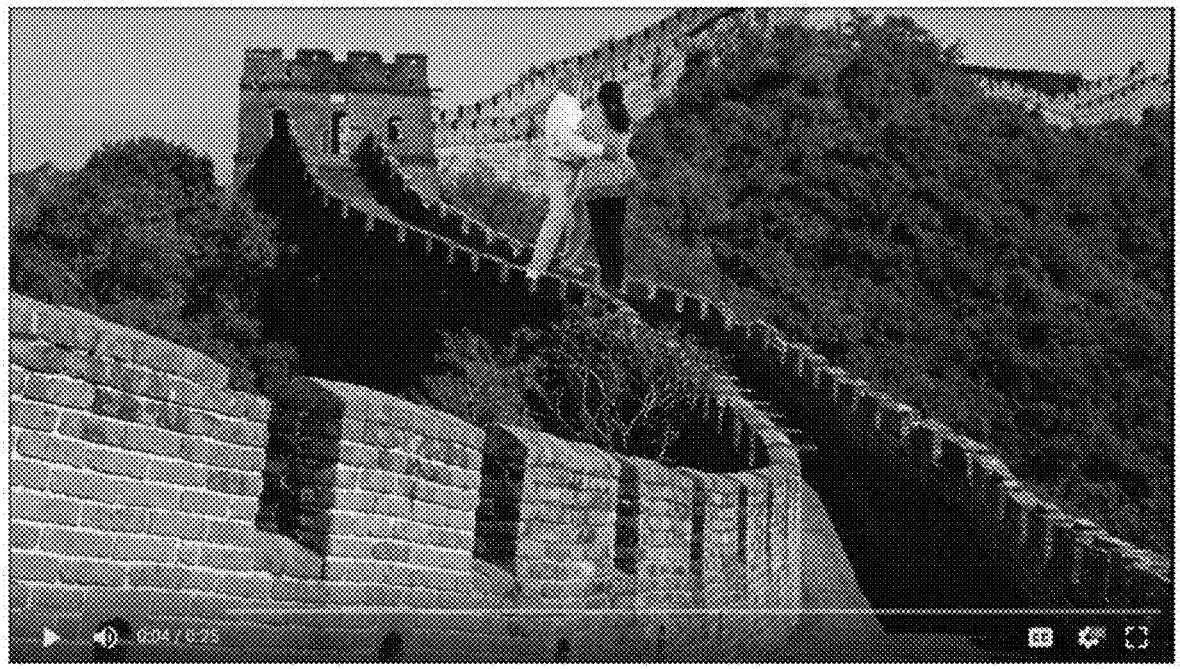
FIG. 37. Example of augmented reality: a user dancing at the Great Wall of China, in an application of green screen capture, video object segmentation, and overlay (video courtesy F. McFadden). Depth sensors (not used) can further ease the object segmentation task.
Figure 38:
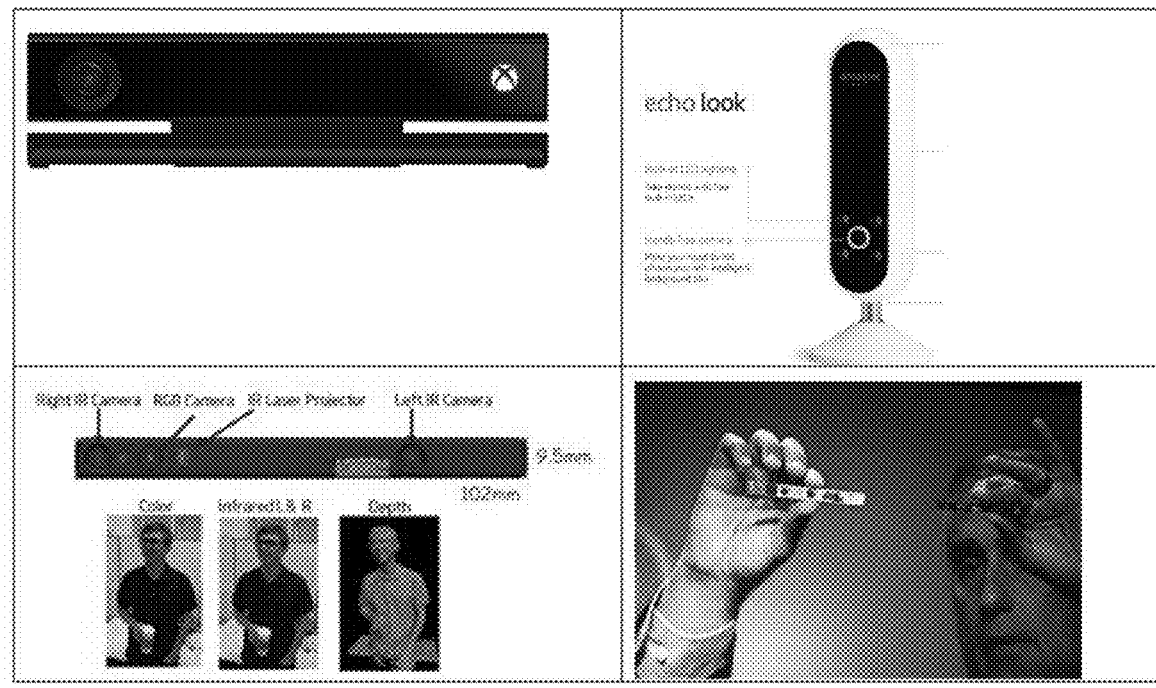
FIG. 38. Some available commercial sensor systems incorporating a depth sensor. Linear order from upper left: (a) Microsoft Kinect for Xbox One, (b) Amazon Echo Look, (c) Intel RealSense camera and example acquired images, and (d) miniaturized version, as demonstrated by Intel's CEO, Brian Krzanich. Of these, Microsoft and Intel have each developed powerful software development kits (SDKs) with their products, with APIs to mid- and low-level access points.

An elementary example of augmented reality is shown in FIG. 37, where the image is composed using well-known green-screen techniques. FIG. 38 shows some of the consumer grade 3D (RGB-Depth) sensors available, and FIG. 39 shows a direct 3D capture from the Kinect sensor (without further processing such as smoothing/refinement), for illustrative purposes. These are the modern, consumer version of airport-grade versions (FIG. 36) used at major facilities, and even proposed for commercial use.

Alternative Considerations

Embodiments develop an AI-based personal scan of a user, based on image and optionally depth sensing, plus database-trained models and deep learning, to create a 3D model of the user (avatar). This has applications in many areas, such as video games, movies, messaging, and retail.

For illustrative purposes, a wearable article application is disclosed, in which a user needs to "try on" a wearable article. Embodiments of the invention assist in doing this virtually, by visualization. This is fundamentally a data merging problem. Two related approaches are used: a 2D approach, and a 3D approach. In both cases, the inputs and outputs of the system are the same. The inputs are images of a user, and a wearable article. The outputs are: (a) an image of the user wearing the wearable article, and (b) a fitness quality estimate of the wearable article on the user. For the 3D approach, the system uses body shape modeling, as well as 3D modeling of wearable article, and merge them in 3D. Such 3D modeling can be achieved using consumer multi-sensor systems, potentially with depth sensors, and 3D scanning software. But modern advances in computer vision can enable this capability even with standard RGB video sensors, available on all modern smartphones, tablets and laptops. From a standard 2D color image (or set of images) of a user, the 3D body shape of the user is obtained, using a combination of pre-trained models of human body shapes, as well as user input such as gender, height, and weight. This also allows a 2D approach to the task, although 3D methods are still under the hood, and this is a single package of tools.

The disclosed framework changes the way a wearable article is labeled. By means of aggregating 3D models of the general population, and deep learning techniques, a new discrete set of 3D body size codes are developed. These enable fine-grained wearable article size labeling, as well as metrics indicating fitness quality assessment of the wearable article on the user. This can greatly improve confidence in online wearable article related transactions. This technology can show the user what a potential purchased wearable article would look like on them, without leaving home.

However, this is just one example of use of the disclosed techniques in augmented reality. This same 3D modeling technology can be used for several other augmented reality based applications. By adding captured motion analysis, the disclosed techniques allow video games to have a realistic avatar of individual players, while digital movies can include the user in a starring role. And video messaging can be enhanced to have many of these same elements, mixing live and stored media elements for truly rich messaging. Embodiments enable several other applications in business, government, and entertainment.

Online retail of wearable articles has one disadvantage: the buyer cannot try the wearable article on. Up to now, all the buyer had available to judge the fitness quality of a wearable article was the size label, bearing a number (such as neck or waist size); as is well known, this is entirely insufficient.

The unprecedented rise of online shopping, has inexorably led to perhaps the final frontier—the retail wearable article market. But unlike like the selling of objects and services that are generic, where every customer needs the same object or service, wearable article is much more personal—there is no one-size-fits-all here.

Conventional techniques cannot adequately help you select an outfit to buy online in the first place. That is because a key aspect of buying clothes—the reason why we go to stores—is to try on clothes in person to see how well they fit. The currently used labels on wearable article often tend to use a single parameter to indicate size, e.g., neck-size for shirts, waist-size for pants, etc. Sometimes these are qualified with suggestive words, for example, for pants: "slim fit", "regular", or "loose fitting". But these existing labels are entirely inadequate to provide any assurance that they would fit any particular buyer, even if they were aware of their own "size". That is because one number cannot begin to describe a person's detailed physiognomy. Without this, the online wearable article sales business cannot achieve its true potential. Embodiments of the invention address this problem among with others.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of processing imagery, representing a plurality of 3-dimensional (3D) objects, comprising the following steps:
    generating, using 3D modeling, a plurality of 3D models, each 3D model corresponding to a 3D object from the plurality of 3D objects, wherein a 3D model is represented using one of point clouds or tilings, wherein the plurality of 3D models comprises a base 3D model corresponding to a human body and a set of remaining 3D models each corresponding to a respective wearable article;
    extracting features describing each 3D model;
    matching the extracted features of the 3D models to develop a correspondence between the based 3D model and each of the remaining 3D models, wherein the correspondence aligns the 3D objects spatially, so that they are geometrically matched as close as possible;
    geometrically mapping each of the remaining 3D models to the base 3D model by overlaying each of the remaining 3D models on the base 3D model to obtain a unified superimposed model;
    using a first neural network model, extracting numerical tensor features from the 3D models that sample the geometry of the 3D models, the first neural network model having a first set of layers configured to construct and update a graph indicating geometric structures of a 3D model of the plurality of 3D models, and wherein an initial stage of first set of layers of the first neural network model generates generic features from the 3D models and subsequent stages of the first set of layers of the first neural network model generate specific features representing regions of interest in the 3D models by analyzing the generic features;
    using the second neural network model, matching the extracted numerical tensor features of the of the remaining 3D models to the base 3D model to perform match analysis to determine, for each remaining 3D model, a metric indicating a degree of spatial match between the remaining 3D model and the base model, wherein the second neural network model has a second set of layers configure to determine the metric based upon differences between corresponding numerical tensor features of the remaining 3D model and the base 3D model;
    generating a 2-dimensional image corresponding to a view of the superimposed model; and
    sending the generated 2-dimensional image and the determined metrics of the superimposed model for presentation.

2. The method of claim 1, wherein generating using 3D modeling comprises:
    obtaining imagery representing at least one of the 3D objects by use of color images obtained from a color camera and depth images obtained from a depth sensor, and
    converting the color images and depth images of the 3D object into a 3D model.

3. The method of claim 2, wherein the imagery representing the 3D objects is obtained from a color camera and involves one or more 2D images of each of the 3D objects, wherein the 3D modeling phase involves shape learning based on databases storing clusters of similar shapes, to convert the imagery to 3-dimensional models.

4. The method of claim 1, further comprising classifying the base 3D model by:
    storing a plurality of 3D models, each 3D model representing a type of human body or portions thereof in a population of users;
    extracting numerical feature tensors from the stored 3D models, by taking horizontal cross-sections of the 3D models, and extracting features such as circumference, area, and volume between cross-sections;
    clustering the numerical feature tensors to segment the stored 3D models into a plurality of distinct clusters; and
    classifying the base 3D model to a particular cluster by a proximity analysis to the elements of the cluster cells.

5. The method of claim 1, wherein the extracted generic features include sets of tensors representing the corners, edges and points of inflection in the 3D model.

6. The method of claim 1, wherein the generated specific features include sets of vectors representing the geometry of unique regions in the input.

7. The method of claim 1, wherein training the first neural network model comprises:
    training the first neural network model with training data comprising ground truth information regarding a set of 3D/2D inputs;
    periodically updating the training data using new user 3D/2D inputs; and
    periodically retraining the first neural network model with the updated training data either online or offline.

8. The method of claim 1, wherein the second neural network model matches numerical tensor features of a remaining 3D model of the set of remaining 3D models by finding corresponding sets of tensor features of the remaining 3D model and base 3D model that have the highest correlation.

9. The method of claim 1, further comprising training the second neural network model by:
    training the second neural network model with training data comprising ground truth information regarding a training set of extracted features and the correlation between them;
    periodically updating the training data using new extracted features and their correlation; and
    periodically retraining the second neural network model with the updated training data either online or offline.

10. The method of claim 1, wherein geometrically mapping a pair of 3D models comprises, using trained deep neural networks to orient and overlay the 3D models.

11. The method of claim 10, wherein orienting and overlaying the 3D models comprises finding one or more transformations that map the matched features and applying the one or more transformation to one or more other 3D models.

12. The method of claim 10, wherein training the deep neural network comprises:
    training a deep neural network with training data comprising ground truth information regarding the 3D/2D inputs, extracted features, the transformation between matched features and the mapped inputs;
    periodically updating the training data using the new user 3D/2D input, extracted features and transformation between matched features; and
    periodically retraining the deep neural network with the updated training data either online or offline.

13. A computer system comprising:
one or more computer processors; and
a non-transitory computer readable storage medium storing instructions for:
- generating, using 3D modeling, a plurality of 3D models, each 3D model corresponding to a 3D object from the plurality of 3D objects, wherein a 3D model is represented using one of point clouds or tilings, wherein the plurality of 3D models comprises a base 3D model corresponding to a human body and a set of remaining 3D models each corresponding to a respective wearable article;
- extracting features describing each 3D model;
- matching the extracted features of the 3D models to develop a correspondence between the based 3D model and each of the remaining 3D models, wherein the correspondence aligns the 3D objects spatially, so that they are geometrically matched as close as possible;
- geometrically mapping each of the remaining 3D models to the base 3D model by overlaying each of the remaining 3D models on the base 3D model to obtain a unified superimposed model;
- using a first neural network model, extracting numerical tensor features from the 3D models that sample the geometry of the 3D models, the first neural network model having a first set of layers configured to construct and update a graph indicating geometric structures of a 3D model of the plurality of 3D models, and wherein an initial stage of first set of layers of the first neural network model generates generic features from the 3D models and subsequent stages of the first set of layers of the first neural network model generate specific features representing regions of interest in the 3D models by analyzing the generic features;
- using the second neural network model, matching the extracted numerical tensor features of the of the remaining 3D models to the base 3D model to perform match analysis to determine, for each remaining 3D model, a metric indicating a degree of spatial match between the remaining 3D model and the base model, wherein the second neural network model has a second set of layers configure to determine the metric based upon < > corresponding numerical tensor features of the remaining 3D model and the base 3D model;
- generating a 2-dimensional image corresponding to a view of the superimposed model; and
- sending the generated 2-dimensional image and the determined metrics of the superimposed model for presentation.

14. The computer system of claim 13, wherein instructions for generating using 3D modeling comprise instructions for:
- obtaining imagery representing at least one of the 3D objects by use of RGB (color) imaging and depth imaging, and
- converting the RGB and depth images into a 3D model.

15. The computer system of claim 14, wherein the imagery representing the 3D objects is obtained from an ordinary RGB (color) camera and involves one or more images of each of the 3D objects, wherein the 3D modeling phase involves shape learning through databases, to convert the 2D imagery to 3-dimensional models.

16. The computer system of claim 13, wherein the instructions are further for classifying the base 3D model by:
- storing a plurality of 3D models, each 3D model representing a type of human body or portions thereof in a population of users;
- extracting numerical feature tensors from the stored 3D models, by taking horizontal cross-sections of the 3D models, and extracting features such as circumference, area, and volume between cross-sections;
- clustering the numerical feature tensors to segment the stored 3D models into a plurality of distinct clusters; and
- classifying the base 3D model to a particular cluster by a proximity analysis to the elements of the cluster cells.

17. The computer system of claim 13, wherein training the first neural network model comprises:
- training the first neural network model with training data comprising ground truth information regarding a set of 3D/2D inputs;
- periodically updating the training data using new user 3D/2D inputs; and
- periodically retraining the first neural network model with the updated training data either online or offline.

* * * * *

UNITED STATES PATENT AND TRADEMARK OFFICE
CERTIFICATE OF CORRECTION

PATENT NO. : 10,621,779 B1  
APPLICATION NO. : 15/990212  
DATED : April 14, 2020  
INVENTOR(S) : Topiwala et al.

Page 1 of 1

It is certified that error appears in the above-identified patent and that said Letters Patent is hereby corrected as shown below:

In the Claims

Column 23, Claim 1, Line 41, delete "numerical tensor features of the of the remaining" and insert --numerical tensor features of the remaining--

Column 25, Claim 13, Line 38, delete "numerical tensor features of the of the remaining" and insert --numerical tensor features of the remaining--

Column 26, Claim 13, Line 1, delete "the metric based upon < > corresponding numerical" and insert --the metric based upon corresponding numerical--

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*